(12) United States Patent
Shima et al.

(10) Patent No.: US 11,794,891 B2
(45) Date of Patent: Oct. 24, 2023

(54) AERIAL VEHICLE EQUIPPED WITH MULTICOPTER MECHANISM

(71) Applicant: JAPAN AEROSPACE EXPLORATION AGENCY, Tokyo (JP)

(72) Inventors: Eiji Shima, Tokyo (JP); Seiji Tsutsumi, Tokyo (JP); Keiichiro Fujimoto, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 276 days.

(21) Appl. No.: 17/413,896

(22) PCT Filed: Jul. 19, 2019

(86) PCT No.: PCT/JP2019/028386
§ 371 (c)(1),
(2) Date: Jun. 14, 2021

(87) PCT Pub. No.: WO2020/121582
PCT Pub. Date: Jun. 18, 2020

(65) Prior Publication Data
US 2022/0048617 A1 Feb. 17, 2022

(30) Foreign Application Priority Data
Dec. 14, 2018 (JP) .................. 2018-234303

(51) Int. Cl.
*B64C 29/00* (2006.01)
*B64C 9/00* (2006.01)
*B64D 27/24* (2006.01)

(52) U.S. Cl.
CPC ............ *B64C 29/0033* (2013.01); *B64C 9/00* (2013.01); *B64D 27/24* (2013.01); *B64C 2009/005* (2013.01)

(58) Field of Classification Search
CPC . B64C 29/0033; B64C 9/00; B64C 2009/005; B64C 11/001; B64D 27/24; B64U 30/26; B64U 30/291; B64U 50/14
See application file for complete search history.

(56) References Cited

U.S. PATENT DOCUMENTS 9,499,266 B1 * 11/2016 Garreau .................... B64C 9/00
11,077,937 B1 * 8/2021 Bruell ................. B64C 29/0033
(Continued)

FOREIGN PATENT DOCUMENTS

CN 207374652 U 5/2018
CN 109263931 A 1/2019
(Continued)

OTHER PUBLICATIONS

International Search Report dated Oct. 21, 2019 in International Application No. PCT/JP2019/028386.
(Continued)

*Primary Examiner* — Rodney A Bonnette
(74) *Attorney, Agent, or Firm* — Saliwanchik, Lloyd & Eisenschenk

(57) ABSTRACT

An aerial vehicle includes a propulsion unit and a fuselage unit. The propulsion unit includes a rotary shaft extending in a first direction and thrust producing mechanisms provided at both ends of the rotary shaft and produces a propulsion force for flying in air. The fuselage unit is suspended from the propulsion unit below the rotary shaft, has a center of gravity at a position below the rotary shaft, is configured to freely rotate around the rotary shaft, and is capable of storing an article.

20 Claims, 15 Drawing Sheets

(56) References Cited

U.S. PATENT DOCUMENTS

| | | |
|---|---|---|
| 2002/0100834 A1 | 8/2002 | Baldwin |
| 2006/0231675 A1* | 10/2006 | Bostan .................. B64C 27/20 |
| | | 244/12.1 |
| 2009/0084890 A1 | 4/2009 | Reinhardt |
| 2015/0053826 A1 | 2/2015 | Tsunekawa et al. |
| 2015/0314865 A1 | 11/2015 | Bermond et al. |
| 2018/0002011 A1 | 1/2018 | McCullough et al. |
| 2018/0265189 A1 | 9/2018 | Zhang et al. |

FOREIGN PATENT DOCUMENTS

| | | |
|---|---|---|
| CN | 109263957 A | 1/2019 |
| EP | 3415424 A1 | 12/2018 |
| JP | H05-77789 A | 3/1993 |
| JP | 2013-189104 A | 9/2013 |
| JP | 2016-501773 A | 1/2016 |
| JP | 6266731 B1 | 1/2018 |
| JP | 2018-127215 A | 8/2018 |
| KR | 10-2017-0135577 A | 12/2017 |

OTHER PUBLICATIONS

Office Action dated Aug. 19, 2022 in Japanese Application No. 2020-559698.
Office Action dated Apr. 22, 2022 in Japanese Application No. 2020-559698.

\* cited by examiner

AERIAL VEHICLE EQUIPPED WITH MULTICOPTER MECHANISM

CROSS-REFERENCE TO RELATED APPLICATIONS

This application is the U.S. national stage application of International Patent Application No. PCT/JP2019/028386, filed Jul. 19, 2019, which claims the benefit under 35 U.S.C. § 119 of Japanese Application No. 2018-234303, filed Dec. 14, 2018, the disclosures of each of which are incorporated herein by reference in their entirety.

TECHNICAL FIELD

The present invention relates to an aerial vehicle equipped with a multicopter mechanism.

BACKGROUND ART

Aerial vehicles including rotorcraft called drone are used for aerial photography, inspections of building facilities, and the like (see Patent Literature 1). Such an aerial vehicle includes a multicopter mechanism with a plurality of rotary wings. The provision of the multicopter mechanism makes vertical take-off and landing possible. Therefore, aerial vehicles including rotorcraft for aerial photography, inspections of building facilities, and the like have been widely spread.

In recent years, those multicopter mechanisms are expected to be used in a next stage for transportation applications as delivery drones, flying taxis, and the like.

CITATION LIST

Patent Literature

Patent Literature 1: Japanese Patent Application Laid-open No. 2018-127215

DISCLOSURE OF INVENTION

Technical Problem

However, in order to use such aerial vehicles for the transportation applications, it is desirable to further improve the cruising distance and the cruise stability.

In view of the above-mentioned circumstances, it is an objective of the present invention to provide, as to an aerial vehicle equipped with a multicopter mechanism, an aerial vehicle having both a vertical take-off and landing function and a horizontal cruise function and having an excellent cruising performance.

Solution to Problem

In order to accomplish the above-mentioned objective, an aerial vehicle according to an embodiment of the present invention includes a propulsion unit and a fuselage unit. The propulsion unit includes a rotary shaft extending in a first direction and thrust producing mechanisms provided at both ends of the rotary shaft and produces a propulsion force for flying in air. The fuselage unit is suspended from the propulsion unit below the rotary shaft, has a center of gravity at a position below the rotary shaft, is configured to be freely rotate around the rotary shaft, and is capable of storing an article.

Advantageous Effects of Invention

As described above, in accordance with the present invention, an aerial vehicle having both a vertical take-off and landing function and a horizontal cruise function and having an excellent cruising performance is provided.

MODE(S) FOR CARRYING OUT THE INVENTION

Hereinafter, an embodiment of the present invention will be described with reference to the drawings. In each of the drawings, XYZ-axis coordinates are introduced in some cases. Moreover, the same members or members having the same function will be denoted by the same reference sign in some cases and descriptions of those members will be omitted as appropriate once they are described in some cases.

Figure 1A:
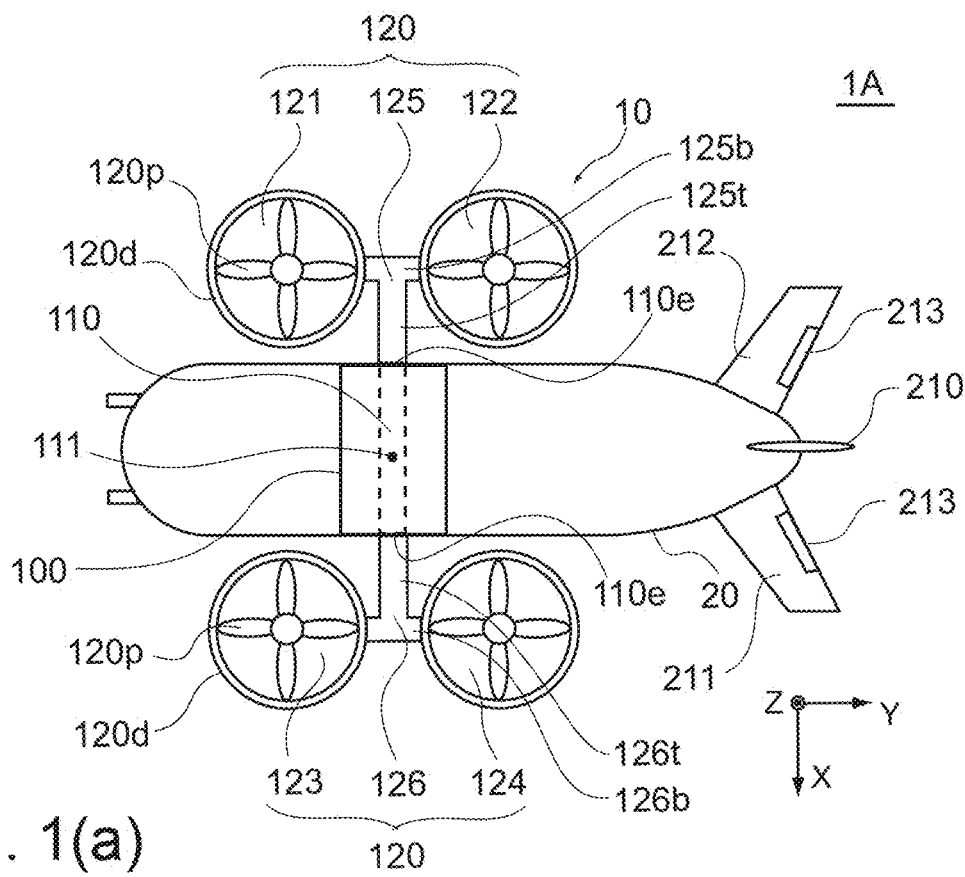
FIG. 1(a) is a schematic top view of an aerial vehicle according to this embodiment.
Figure 1B:
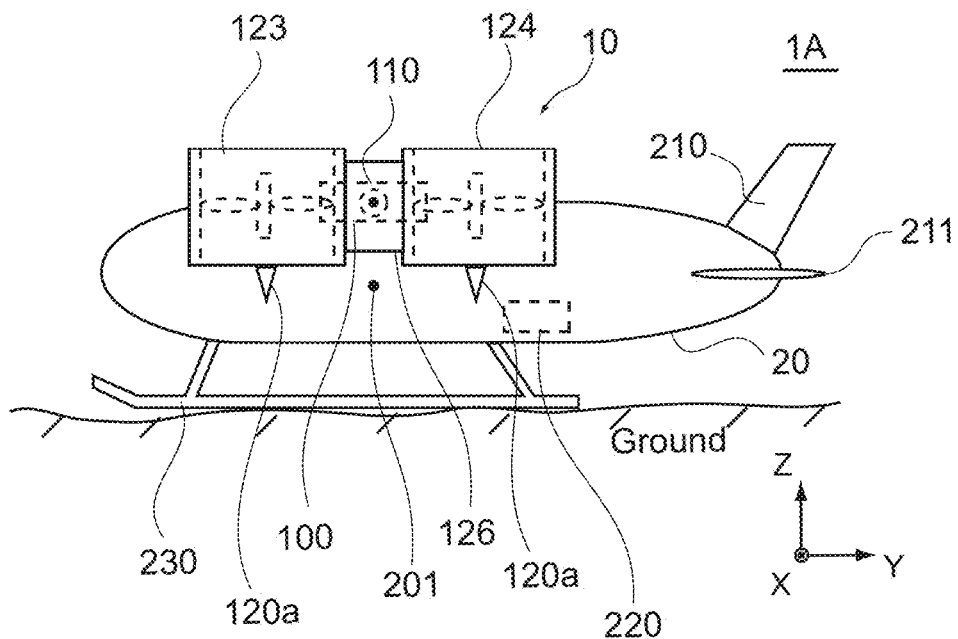
FIG. 1(b) is a schematic side view of the aerial vehicle according to this embodiment.
Figure 2A:
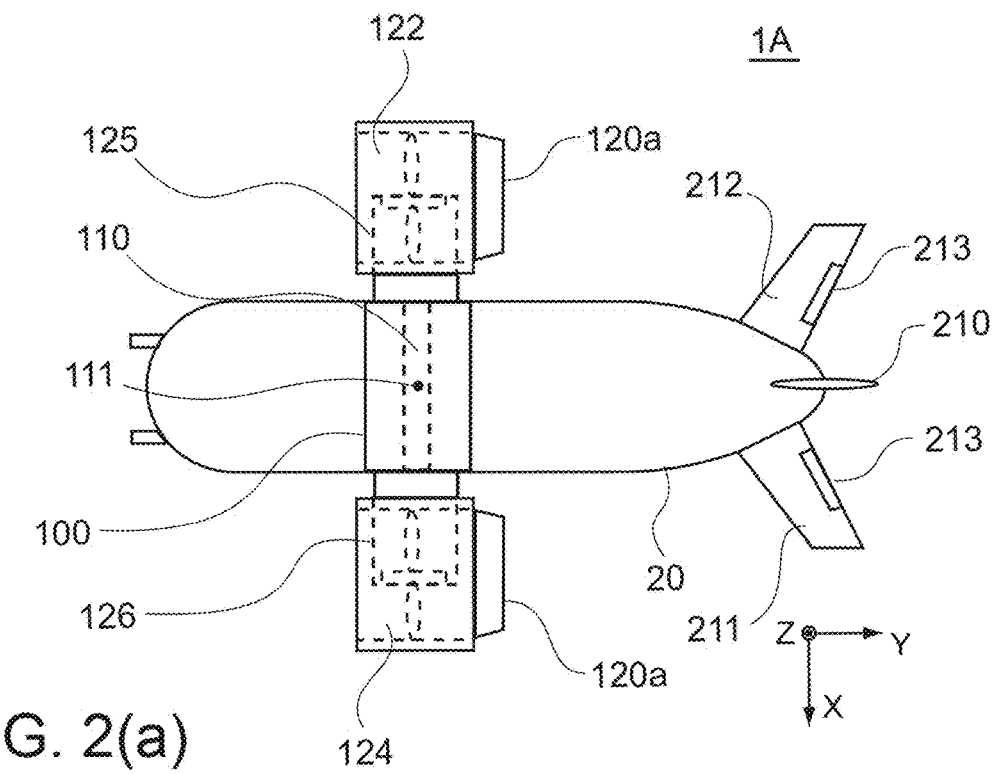
FIG. 2(a) is a schematic top view of the aerial vehicle according to this embodiment.
Figure 2B:
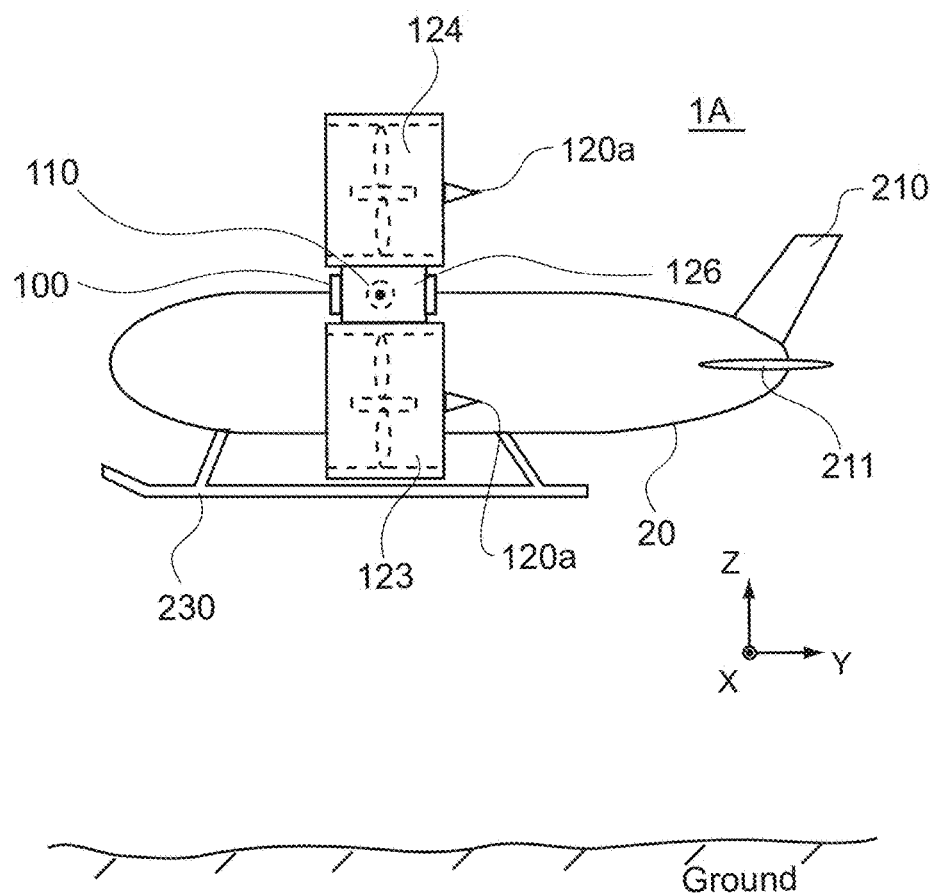
FIG. 2(b) is a schematic side view of the aerial vehicle according to this embodiment.

FIG. 1(a) is a schematic top view of an aerial vehicle according to this embodiment. FIG. 1(b) is a schematic side view of the aerial vehicle according to this embodiment. FIG. 2(a) is a schematic top view of the aerial vehicle according to this embodiment. FIG. 2(b) is a schematic side view of the aerial vehicle according to this embodiment.

Here, FIGS. 1(a) and 1(b) each show, in an aerial vehicle 1A resting on the ground, a state in which planes of rotation of propellers included in a propulsion unit 10 are parallel and FIG. 2(a), (b) shows FIGS. 2(a) and 2(b) each show, in the aerial vehicle 1A cruising horizontally, a state in which the planes of rotation are perpendicular to the ground.

The aerial vehicle 1A according to this embodiment is a multicopter-type aerial vehicle having both a vertical take-off and landing function and a horizontal cruise function. The aerial vehicle 1A is capable of storing an article in a fuselage unit 20 and may be an unmanned aerial vehicle or may be a manned aerial vehicle.

As shown in FIG. 1(a) to FIG. 2(b), the aerial vehicle 1A includes the propulsion unit 10 and the fuselage unit 20. First of all, the propulsion unit 10 will be described.

In the aerial vehicle 1A, the propulsion unit 10 produces a propulsion force for flying in the air. The propulsion unit 10 has a function of suspending the fuselage unit 20. The propulsion unit 10 includes a base body 100, a rotary shaft 110, and thrust producing mechanisms 120.

The base body 100 is a block-shaped support that supports the rotary shaft 110. The base body 100 is held in contact with and fixed to the fuselage unit 20. Examples of the fixation means can include a mechanical means such as bolting and clamping and a means using a magnetic force or electrostatic force.

The rotary shaft 110 penetrates the base body 100. The rotary shaft 110 extends in an X-axis direction (first direction). The rotary shaft 110 is configured to be freely rotate in relation to the base body 100. For example, a sliding member such as a bearing is provided between the rotary shaft 110 and the base body 100 and a contact surface at which the rotary shaft 110 is held in contact with the base body 100 is coated with a sliding layer. Moreover, lubricating oil is applied on a portion between the rotary shaft 110 and the base body 100 in a manner that depends on needs. Moreover, the propulsion unit 10 may be provided with a control function (e.g., a hydraulic brake) that controls the movement of the freely rotatable rotary shaft 110. That is, the rotary shaft 110 freely rotates inside the base body 100 when it is released from this control function.

The thrust producing mechanisms 120 can include propeller mechanisms, for example. Hereinafter, the thrust producing mechanisms 120 will be referred to as "propeller mechanisms 120".

The propeller mechanisms 120 are provided at both ends 110e of the rotary shaft 110. The propeller mechanisms 120 are configured to be approximately point-symmetry with reference to a center 111 of the rotary shaft 110. For example, the propeller mechanism 120 includes, on one side of the fuselage unit 20, an arm portion 125 (first arm portion), a propeller portion 121 (first propeller portion), and a propeller portion 122 (second propeller portion). In addition, the propeller mechanism 120 includes, on the other side of the fuselage unit 20, an arm portion 126 (second arm portion), a propeller portion 123 (third propeller portion), and a propeller portion 124 (fourth propeller portion).

The propeller portion 121 and the propeller portion 122 are mounted on one end 110e of the rotary shaft 110 via the arm portion 125. The propeller portion 123 and the propeller portion 124 are mounted on another end 110e of the rotary shaft 110 via the arm portion 126. In a direction orthogonal to the X-axis direction, the propeller portion 121 and the propeller portion 122 are arranged in parallel and the propeller portion 123 and the propeller portion 124 are arranged in parallel.

For example, the arm portion 125 includes a plate-like trunk portion 125t and the branch portion 125b branching from the trunk portion 125t. Each of the propeller portion 121 and the propeller portion 122 is fixed to a branch portion 125b. Moreover, the arm portion 126 includes a plate-like trunk portion 126t and a branch portion 126b branching from the trunk portion 126t. Each of the propeller portion 123 and the propeller portion 124 is fixed to the branch portion 126b.

The planes of rotation of the propeller portion 121, the propeller portion 122, the propeller portion 123, and the propeller portion 124 are in the same plane. In other words, the propeller shafts of the propeller portion 121, the propeller portion 122, the propeller portion 123, and the propeller portion 124 extend in the same direction. The propeller portion 121, the propeller portion 122, the propeller portion 123, and the propeller portion 124 are each independently controlled and each emit the same propulsion force or each emit different propulsion forces.

Each of the propeller portion 121, the propeller portion 122, the propeller portion 123, and the propeller portion 124 is a ducted fan. For example, each of the propeller portion 121, the propeller portion 122, the propeller portion 123, and the propeller portion 124 includes a propeller 120p and a cylindrical duct 120d surrounding the propeller 120p. The center axis of the propeller 120p corresponds to the center axis of the duct 120d. Moreover, since the propeller 120p is surrounded by the duct 120d, a sound attenuation effect by the duct 120d acts.

Since the propeller portion 121 and the propeller portion 122 are supported by the rotary shaft 110 via the arm portion 125 and the propeller portion 123 and the propeller portion 124 are supported by the rotary shaft 110 via the arm portion 126, the propeller mechanisms 120 can freely rotate with the rotary shaft 110 by using the rotary shaft 110 as the center axis.

For example, when the aerial vehicle 1A vertically takes off or lands, the planes of rotation of the propeller mechanisms 120 become approximately parallel to the ground (FIGS. 1(a) and 1(b)). Moreover, when the aerial vehicle 1A horizontally cruises, the planes of rotation of the propeller mechanisms 120 become approximately perpendicular to the ground (FIGS. 2(a) and 2(b)).

When the aerial vehicle 1A horizontally cruises, the center axes of the ducts 120d become approximately parallel to the ground. Accordingly, the ducts 120d function as wing portions. Moreover, a main surface of the trunk portion 125t of the arm portion 125 becomes approximately flush with a main surface of the base body 100 and a main surface of the trunk portion 126t of the arm portion 126 becomes approximately flush with the main surface of the base body 100. Accordingly, parts of the arm portions 125 and 126 function as wing portions.

That is, when the aerial vehicle 1A horizontally cruises, lift is produced by the ducts 120d or the arm portions 125 and 126. Moreover, an aileron 120a (third aileron) is provided at the rear of the duct 120d included in each of the propeller portion 121, the propeller portion 122, the propeller portion 123, and the propeller portion 124.

Moreover, the propulsion unit 10 includes a sensor, a computer, and the like required for a function of producing an attitude control force and navigation, guide, and control. A signal required for the function of producing the attitude control force and the navigation, guide, and control is sent from the ground.

The fuselage unit 20 is suspended from the propulsion unit 10 below the rotary shaft 110. The fuselage unit 20 has a center of gravity 201 at a position below the rotary shaft 110. For example, the center of gravity 201 is positioned just below the center 111 of the rotary shaft 110. Since the fuselage unit 20 is suspended from the propulsion unit 10 and the upper part of the fuselage unit 20 is fixed to the base body 100, the fuselage unit 20 is also configured to be freely rotate around the rotary shaft 110.

The fuselage unit 20 has a shape having a short direction in the X-axis direction and a longitudinal direction in a Y-axis direction (second direction) orthogonal to the X-axis direction. The fuselage unit 20 has an outer shape designed to provide optimal drag to the coming air flow. For example, the outer shape of the fuselage unit 20 is a streamline shape, a torpedo shape, or the like having the Y-axis direction as the longitudinal direction. Moreover, since the center of gravity 201 of the fuselage unit 20 is positioned just below the center 111 of the rotary shaft 110, the fuselage unit 20 maintains its horizontal state while it is suspended from the propulsion unit 10 even when the aerial vehicle 1A vertically climbs from the ground.

In this embodiment, a direction in which the aerial vehicle performing forward flight (direction to fly against the air flow) in the horizontal cruise is defined as the front (forward) of the aerial vehicle and a direction opposite to such a direction is defined as the rear (backward). The fuselage unit 20 is provided with a vertical tail 210 and horizontal tails 211 and 212 at the rear of the propulsion unit 10. Each of the horizontal tails 211 and 212 is provided with an aileron 213 (first aileron).

The fuselage unit 20 includes a power supply 220 such as a battery that supplies the propeller mechanism with electric power. The power supply 220 is installed in the fuselage unit 20 so as to be automatically slidable in any one of the X-axis direction, the Y-axis direction, and the Z-axis direction, for example. For example, when the position of the center of gravity 201 of the fuselage unit 20 is deviated after an article is loaded in the fuselage unit 20, the power supply 220 slides in any one of the X-axis direction, the Y-axis direction, and the Z-axis direction. The position of the center of gravity 201 can be returned to the original position in this manner.

Moreover, the lower part of the fuselage unit 20 is additionally provided with skids 230 for landing such that the fuselage unit 20 is brought into direct contact with the ground. The skids 230 are, for example, configured as a pair arranged in the X-axis direction and extend in parallel in the Y-axis direction. The skids 230 may be retractable into the fuselage unit 20.

Figure 3:
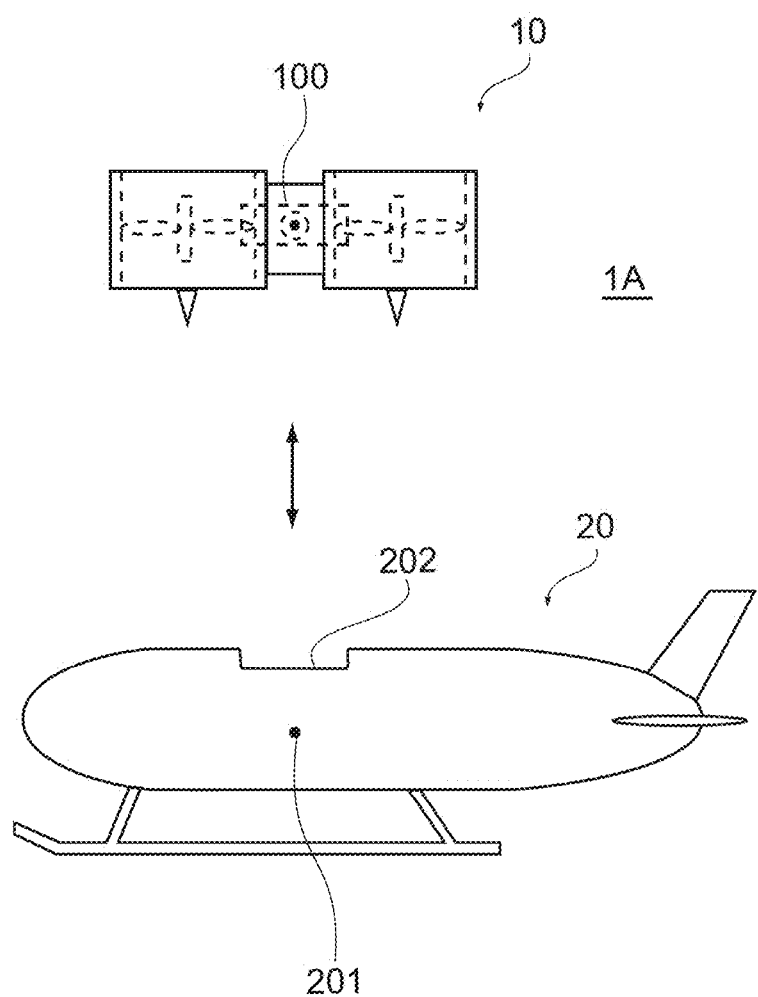
FIG. 3 is another schematic side view of the aerial vehicle according to this embodiment.

FIG. 3 is another schematic side view of the aerial vehicle according to this embodiment.

In the aerial vehicle 1A, the fuselage unit 20 is configured to be removable from the propulsion unit 10. For example, the base body 100 of the propulsion unit 10 is brought into contact with a mounting portion 202 provided in the upper part of the fuselage unit 20, and then the base body 100 is fixed to the mounting portion 202. In addition, the base body 100 can also be detached from the mounting portion 202. The detachment, removal may be manually performed or may be performed in accordance with an external signal.

Next, an operation of the aerial vehicle 1A will be described. In the aerial vehicle 1A, the propeller mechanisms 120 of the propulsion unit 10 turn into a vertical attitude or a horizontal attitude, and with the propulsion force emitted by the propulsion unit 10, the fuselage unit 20 takes off and lands in the vertical attitude and the fuselage unit 20 horizontally cruises in the horizontal attitude.

For example, assuming that the direction of gravity is a vertical direction, the vertical attitude of each of the thrust producing mechanisms represented by the propeller mechanisms 120 is a state in which the axis direction of the thrust axis of the thrust producing mechanism (direction in which thrust acts) is parallel to the vertical direction and the horizontal attitude is a state in which the axis direction of the thrust axis is orthogonal to the vertical direction.

In other words, the vertical attitude of the propeller mechanism 120 is a state in which the propeller plane is perpendicular to the vertical direction and the horizontal attitude is a state in which the propeller plane is parallel to the vertical direction. It should be noted that even when the propeller mechanisms 120 are in the vertical attitude or the horizontal attitude, the fuselage unit 20 of the aerial vehicle 1A maintains the horizontal attitude.

FIG. 4(a) to FIG. 5(b) are schematic side views showing operation examples of the aerial vehicle according to this embodiment.

Figure 4A:
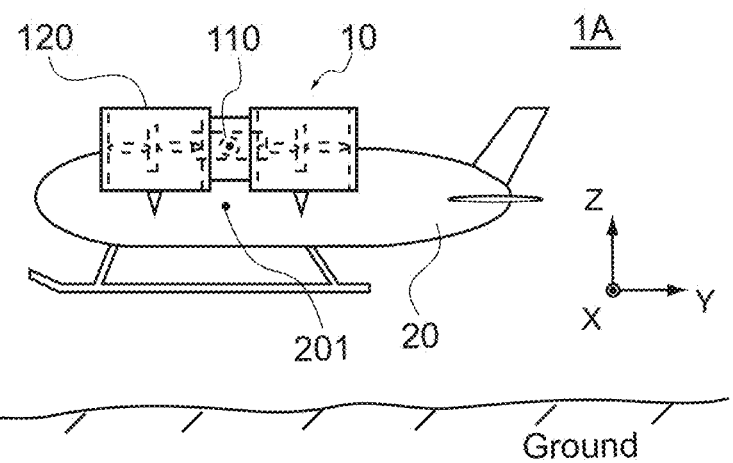
FIGS. 4(a)-4(c) are each a schematic side view showing an operation example in the aerial vehicle according to this embodiment.

For example, FIG. 4(a) shows a state in which the aerial vehicle 1A vertically takes off from the ground. In this state, the longitudinal direction (Y-axis direction) of the fuselage unit 20 and the planes of rotation of the propeller mechanisms 120 are approximately parallel to each other. The aerial vehicle 1A takes off from the ground when the propulsion force of the aerial vehicle 1A, that acts perpendicularly to the ground, exceeds to the gravity of the aerial vehicle 1A.

At this time, the propulsion forces emitted by the propeller portion 121, the propeller portion 122, the propeller portion 123, and the propeller portion 124 are set to be approximately equal, for example. Moreover, the fuselage unit 20 freely rotates around the rotary shaft 110 and the center of gravity 201 of the fuselage unit 20 is positioned below the rotary shaft 110 also after the take-off, and therefore the fuselage unit 20 maintains the horizontal state due to the gravity.

It is assumed that the center of gravity 201 of the fuselage unit 20 overlaps the center 111 of the rotary shaft 110. In this case, once the fuselage unit 20 is tilted around the center of the rotary shaft 110 due to a certain factor, the moments of force of the front and rear of the fuselage unit 20, which are centered on the rotary shaft 110, are balanced, and the fuselage unit 20 cannot be returned to the horizontal state. Since in the aerial vehicle 1A, the center of gravity 201 of the fuselage unit 20 is positioned below the rotary shaft 110, the fuselage unit 20 constantly maintains the horizontal state due to the gravity.

Next, in the air, the propulsion forces (propulsion force B) respectively emitted by the propeller portion 122 and the propeller portion 124 is increased than the propulsion forces (propulsion force A) respectively emitted by the propeller portion 121 and the propeller portion 123 (propulsion force A<propulsion force B).

Accordingly, in the propeller mechanisms 120, a rotational moment around the center of the rotary shaft 110 acts, and the propeller mechanisms 120 start to freely rotate with the rotary shaft 110, around the center of the rotary shaft 110.

Figure 4B:
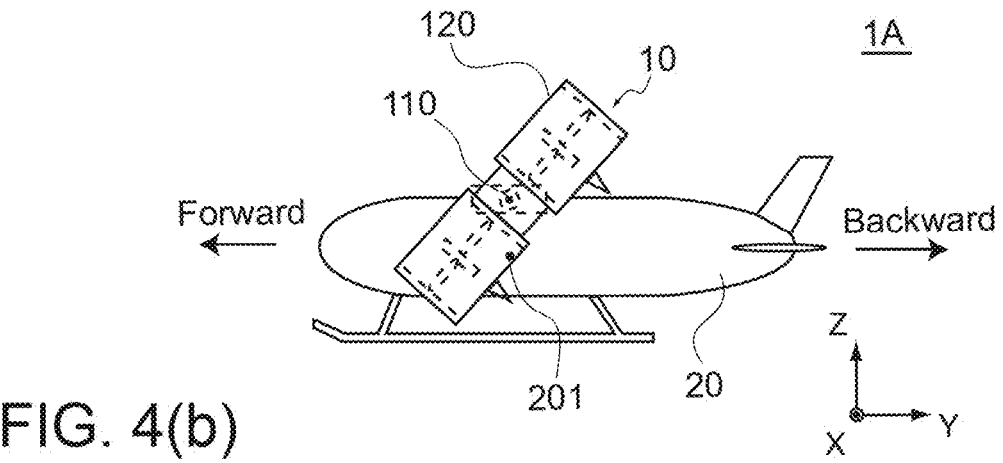

For example, in the direction of the aerial vehicle 1A which is shown in FIG. 4(b), the propeller mechanisms 120 rotate counter-clockwisely around the center of the rotary shaft 110, and start to change the directions. This state is shown in FIG. 4(b).

Also at this time, the fuselage unit 20 freely rotates around the rotary shaft 110 and the center of gravity 201 of the fuselage unit 20 is positioned below the rotary shaft 110, and therefore the fuselage unit 20 maintains the horizontal state due to the gravity. Moreover, the propulsion forces emitted by the propeller mechanisms 120 act obliquely to the ground due to the change of the directions of the propeller mechanisms 120, and the aerial vehicle 1A starts to move forward while climbing.

Figure 4C:
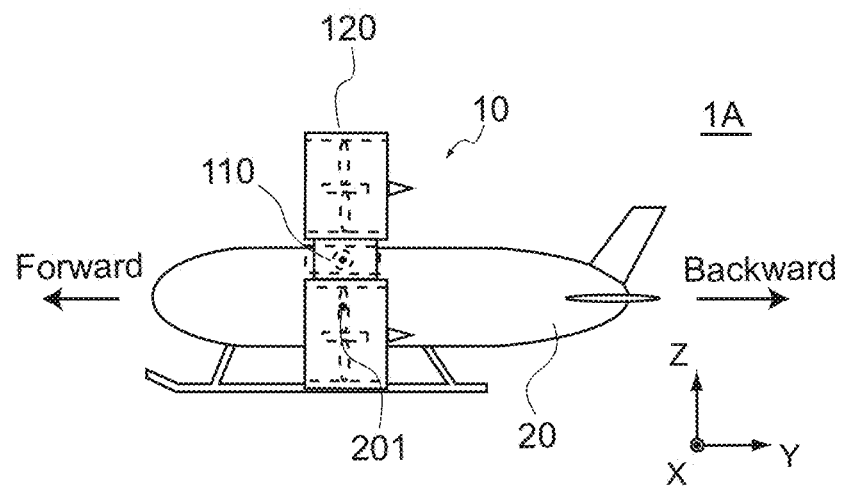

Next, when the longitudinal direction (Y-axis direction) of the fuselage unit 20 and the planes of rotation of the propeller mechanisms 120 become approximately orthogonal to each other due to the free rotation of the propeller mechanisms 120, the propulsion forces emitted by the propeller portion 121, the propeller portion 122, the propeller portion 123, and the propeller portion 124 are set to be approximately equal. This state is shown in FIG. 4(c).

In this state, the propulsion force emitted by the propulsion unit 10 acts horizontally to the ground and the aerial vehicle 1A horizontally cruises. Also at this time, the fuselage unit 20 freely rotates around the rotary shaft 110 and the center of gravity 201 of the fuselage unit 20 is positioned below the rotary shaft 110, and therefore the fuselage unit 20 maintains the horizontal state due to the gravity.

Figure 5A:
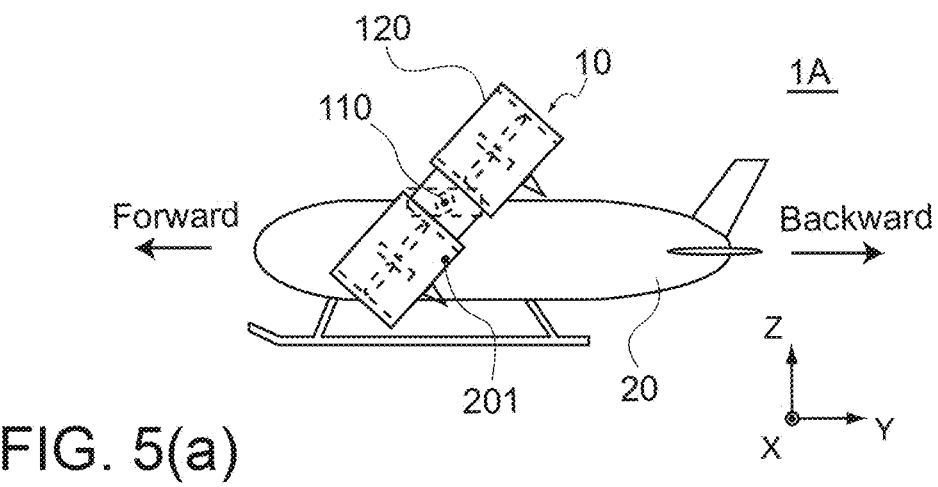
FIGS. 5(a) and 5(b) are each a schematic side view showing an operation example in the aerial vehicle according to this embodiment.

Next, in order to cause the aerial vehicle 1A to land on the ground from the horizontal cruise, the propulsion forces (propulsion force A) respectively emitted by the propeller portion 121 and the propeller portion 123 is increased than the propulsion forces (propulsion force B) respectively emitted by the propeller portion 122 and the propeller portion 124 (propulsion force A>propulsion force B). This state is shown in FIG. 5(a). Then, as in FIG. 4(a), when the planes of rotation of the propeller mechanisms 120 become approximately parallel to the longitudinal direction (Y-axis direction) of the fuselage unit 20, the propulsion force is reduced such that the propulsion force is lower than the gravity of the aerial vehicle 1A, and the aerial vehicle 1A is made to land on the ground.

Figure 5B:
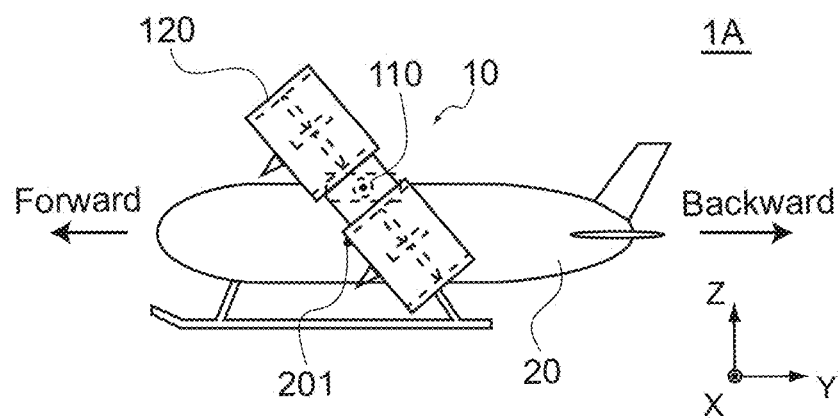

It should be noted that in order to forcibly reduce the velocity of the aerial vehicle 1A performing forward flight, the directions of the propeller mechanisms 120 may be changed such that the propulsion forces are directed to the front of the fuselage unit 20 as shown in FIG. 5(b).

In the aerial vehicle 1A, during a horizontal cruise phase (FIG. 4(c)), lift acts on the aerial vehicle 1A due to the duct 120d or the arm portions 125 and 126 other than the propulsion forces of the propeller mechanisms 120.

Moreover, in the aerial vehicle 1A, each of the propeller portion 121, the propeller portion 122, the propeller portion 123, and the propeller portion 124 is provided with the aileron 120a, and lift is also produced due to those ailerons 120a.

Moreover, in the aerial vehicle 1A, it is designed such that the fuselage unit 20 has optimal drag (lower resistance) to the air flow.

Moreover, in the aerial vehicle 1A, the propeller mechanisms 120 change the directions by freely rotating, around of the center of the rotary shaft 110, and therefore a complex rotating mechanism (e.g., a tiltrotor mechanism) that forcibly changes the directions of the propeller mechanisms 120 inside the aerial vehicle 1A is unnecessary. Therefore, the aerial vehicle 1A is reduced in weight.

Moreover, in the aerial vehicle 1A, the fuselage unit 20 maintains the horizontal state by itself, centered on the rotary shaft 110. Therefore, a complex control technology that constantly keeps the fuselage unit 20 horizontal during a take-off/landing phase and during a horizontal cruise phase is also unnecessary.

Thus, when the aerial vehicle 1A horizontally cruises, load is unlikely to apply on the propeller mechanisms 120 and the aerial vehicle 1A can fly a longer range with lower electric power. Moreover, the aerial vehicle 1A does not require a complex rotating mechanism, and therefore failures are reduced and the reliability in the take-off/land and the horizontal cruise is improved.

Moreover, in the aerial vehicle 1A, even in a case where a moment of force (pitching moment) in which the fuselage unit 20 turns about the rotary shaft 110 due to the air flow acts on the fuselage unit 20 during a horizontal cruise phase, a force that reduces that the moment of force acts on the fuselage unit 20 due to the horizontal tails 211 and 212 additionally provided to the fuselage unit 20.

Moreover, in the aerial vehicle 1A, even in a case where a moment of force in which the fuselage unit 20 vibrates about the rotary shaft 110 due to the air flow acts on the fuselage unit 20, a moment of force that overcomes the vibration can be made to act on the fuselage unit 20 due to the ailerons 213 additionally provided to the horizontal tails 211 and 212.

Accordingly, the fuselage unit 20 can stably maintain the horizontal state during a horizontal cruise phase. Moreover, during a take-off/landing phase and during a horizontal cruise phase, the fuselage unit 20 constantly maintains the horizontal direction, and the aerial vehicle 1A can securely transport precision machines, fragile articles, valuable articles, liquids, and the like, for example.

Moreover, in the aerial vehicle 1A, for example, when the ailerons 120a additionally provided to the propeller portion 121 and the propeller portion 122 are tilted upward and the propeller portion 123 and the ailerons 120a additionally provided to the propeller portion 124 are tilted downward, a rolling motion (motion around the longitudinal axis of the fuselage unit 20) can be easily performed.

Thus, the aerial vehicle 1A has both the vertical take-off and landing function and the horizontal cruise function and has an excellent cruising performance.

Next, modified examples of the aerial vehicle will be described.

Modified Example 1

Figure 6A:
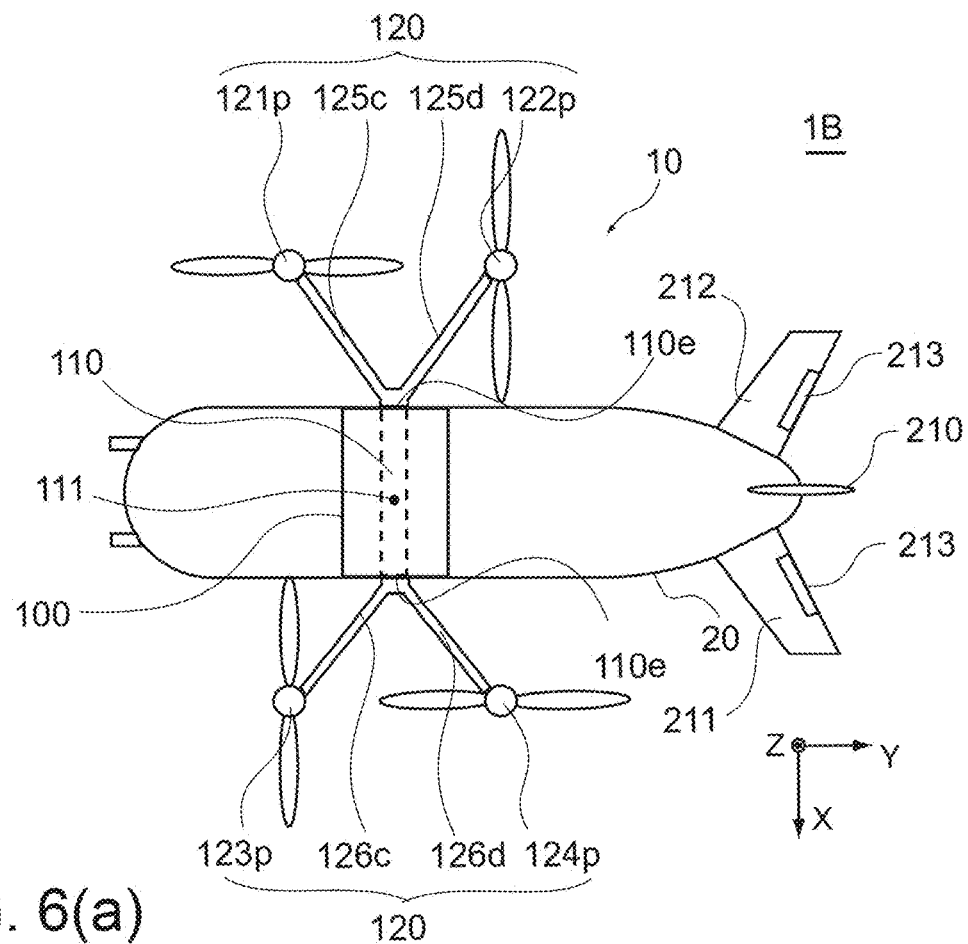
FIG. 6(a) is a schematic top view of an aerial vehicle according to Modified Example 1.
Figure 6B:
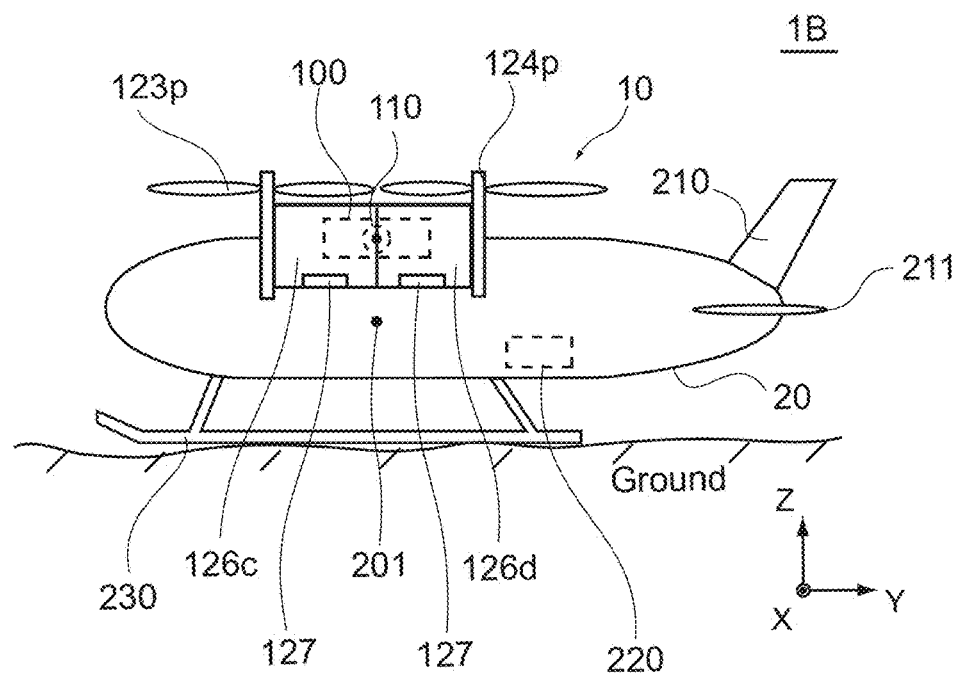
FIG. 6(b) is a schematic side view of the aerial vehicle according to Modified Example 1.

FIG. 6(a) is a schematic top view of an aerial vehicle according to Modified Example 1. FIG. 6(b) is a schematic side view of the aerial vehicle according to Modified Example 1.

In an aerial vehicle 1B shown in FIGS. 6(a) and 6(b), propeller mechanisms 120 are not provided with ducts.

For example, the propeller mechanisms 120 of the aerial vehicle 1B include arm portions 125c and 125d and propellers 121p and 122p on one side of the fuselage unit 20. In addition, the propeller mechanisms 120 include arm portions 126c and 126d and propellers 123a and 124p on the other side of the fuselage unit 20. In the aerial vehicle 1B, the arm portions 125c and 125d may be combined as a first arm portion and the arm portions 126c and 126d may be combined as a second arm portion.

For example, the propeller 121p is mounted on one end 110e of a rotary shaft 110 via the plate-like arm portion 125c. The propeller 122p is mounted on the one end 110e of the rotary shaft 110 via the plate-like arm portion 125*d*. The propeller 123*p* is mounted on another end 110*e* of the rotary shaft 110 via the plate-like arm portion 126*c*. The propeller 124*p* is mounted on another end 110*e* of the rotary shaft 110 via the plate-like arm portion 126*d*.

In a direction orthogonal to the X-axis direction, the propeller 121*p* and the propeller 122*p* are arranged in parallel and the propeller 123*p* and the propeller 124*p* are arranged in parallel. Planes of rotation of the propeller 121*p*, the propeller 122*p*, the propeller 123*p*, and the propeller 124*p* are in the same plane.

The propeller 121*p*, the propeller 122*p*, the propeller 123*p*, and the propeller 124*p* are each independently controlled and each emit the same propulsion force or each emit different propulsion forces.

In the aerial vehicle 1B, since the ducts are not provided, the weight is further reduced. Accordingly, the load applied on the propeller mechanisms 120 are further reduced. Moreover, in the aerial vehicle 1B, when the planes of rotation of the propellers become approximately perpendicular to the ground, main surfaces of the arm portions 125*c*, 125*d*, 126*c*, and 126*d* become approximately parallel to the ground. Accordingly, the arm portions 125*c*, 125*d*, 126*c*, and 126*d* function as wings and lift can be provided by the arm portions 125*c*, 125*d*, 126*c*, and 126*d*.

Moreover, in the aerial vehicle 1B, each of the arm portions 125*c*, 125*d*, 126*c*, and 126*d* is provided with an aileron 127 (second aileron). Accordingly, in the aerial vehicle 1B, a rolling motion can be easily performed.

Modified Example 2

Figure 7:
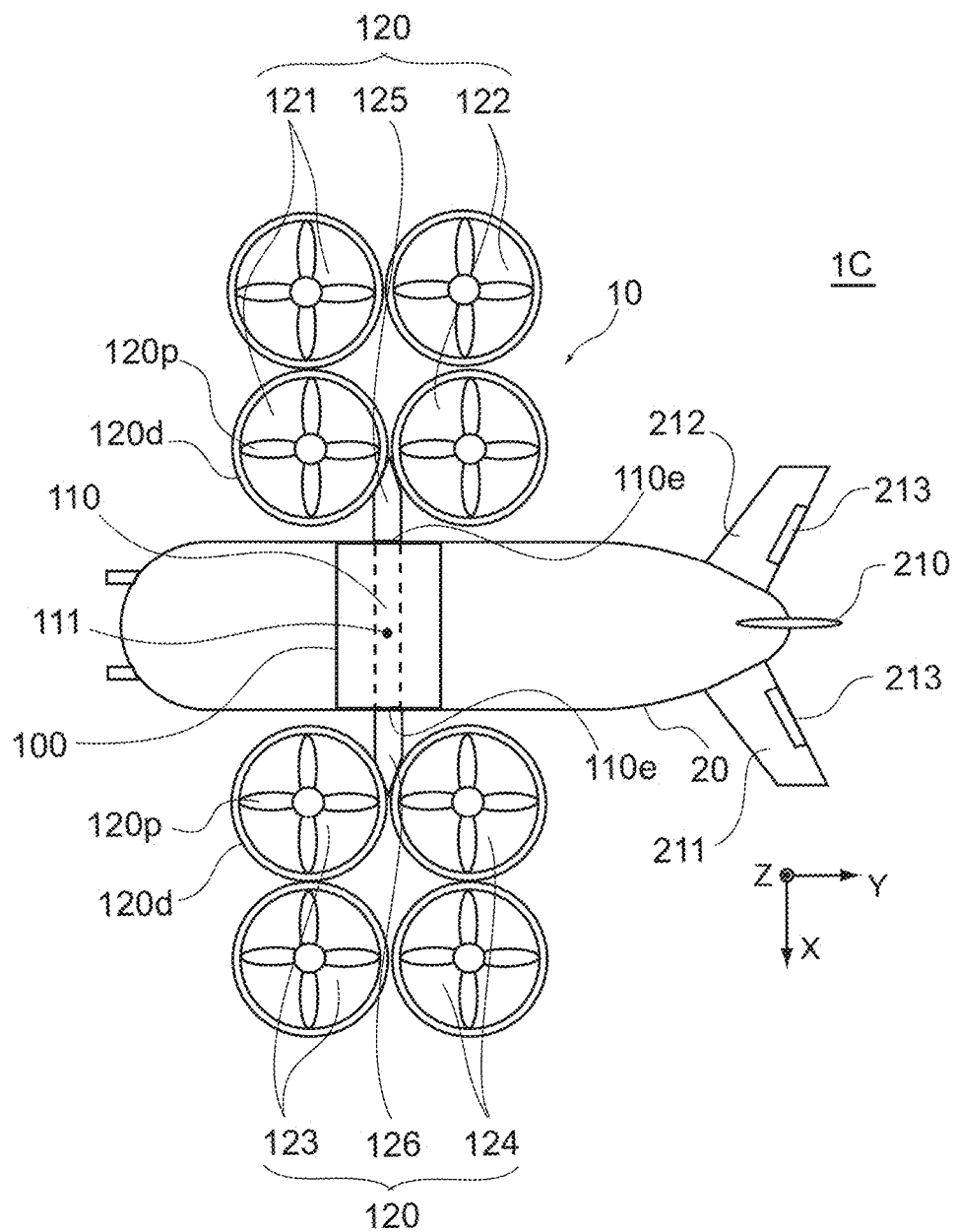
FIG. 7 is a schematic top view of an aerial vehicle according to Modified Example 2.

FIG. 7 is a schematic top view of an aerial vehicle according to Modified Example 2.

In an aerial vehicle 1C shown in FIG. 7, a larger number of propeller portions are provided as compared to the aerial vehicle 1A.

For example, a propeller mechanism 120 of the aerial vehicle 1C includes two propeller portions 121 and two propeller portions 122 on one side of a fuselage unit 20 via a plate-like arm portion 125. In addition, a propeller mechanism 120 includes two propeller portions 123 and two propeller portions 124 via a plate-like arm portion 126 on the other side of the fuselage unit 20.

In the aerial vehicle 1C, in a direction orthogonal to the X-axis direction, the propeller portions 121 and the propeller portions 122 are arranged in parallel and the propeller portions 123 and the propeller portions 124 are arranged in parallel. Moreover, the two propeller portions 121 are arranged in parallel in the X-axis direction and the two propeller portions 122 are arranged in parallel in the X-axis direction. Moreover, the two propeller portions 123 are arranged in parallel in the X-axis direction and two propeller portions 124 are arranged in parallel in the X-axis direction. Moreover, as to the adjacent propeller portions, ducts 120*d* are connected to each other.

With such a configuration, the propulsion forces emitted by the propeller mechanisms 120 further increase. Moreover, even if any one of the propeller portions malfunctions, the propeller portion adjacent thereto in the X-axis direction functions as an auxiliary propeller portion that supports the malfunctioning propeller.

Modified Example 3

Figure 8A:
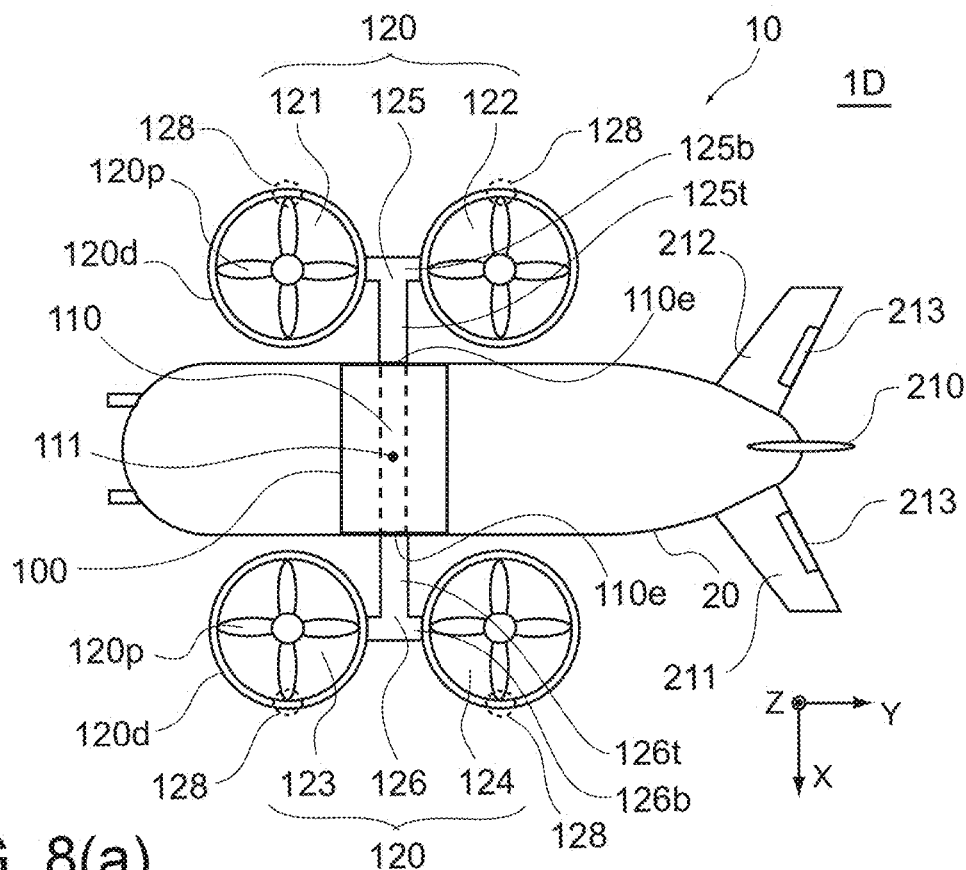
FIG. 8(a) is a schematic top view of an aerial vehicle according to Modified Example 3.
Figure 8B:
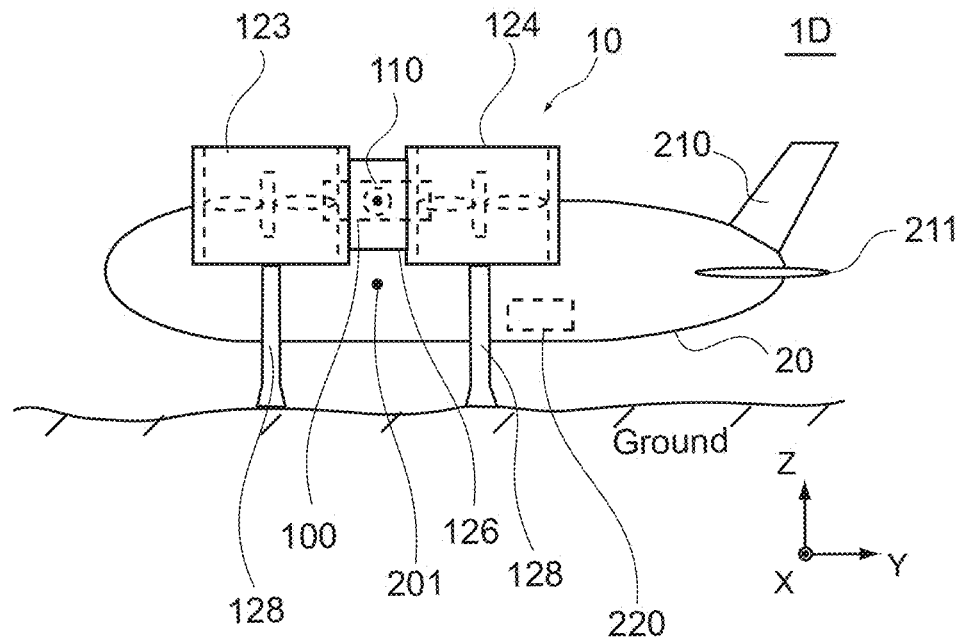
FIG. 8(b) is a schematic side view of the aerial vehicle according to Modified Example 3.

FIG. 8(*a*) is a schematic top view of an aerial vehicle according to Modified Example 3. FIG. 8(*b*) is a schematic side view of the aerial vehicle according to Modified Example 3.

In an aerial vehicle 1D shown in FIGS. 8(*a*) and 8(*b*), leg portions 128 for landing are provided. The leg portion 128 is additionally provided to each duct 120*d* and extends in a direction opposite to a direction in which a propulsion force acts.

With such a configuration, the leg portions 128 function as landing legs that replace the skids 230 on the ground. In addition, the leg portions 128 are directly provided the ducts 120*d*, and therefore the free rotation of the propeller mechanisms 120 are forcibly suppressed by the leg portions 128 on the ground after landing. For instance, even in a case where the aerial vehicle 1D is placed in an environment where strong winds blow for example, the propeller mechanisms 120 do not freely rotate.

Modified Example 4

Figure 9A:
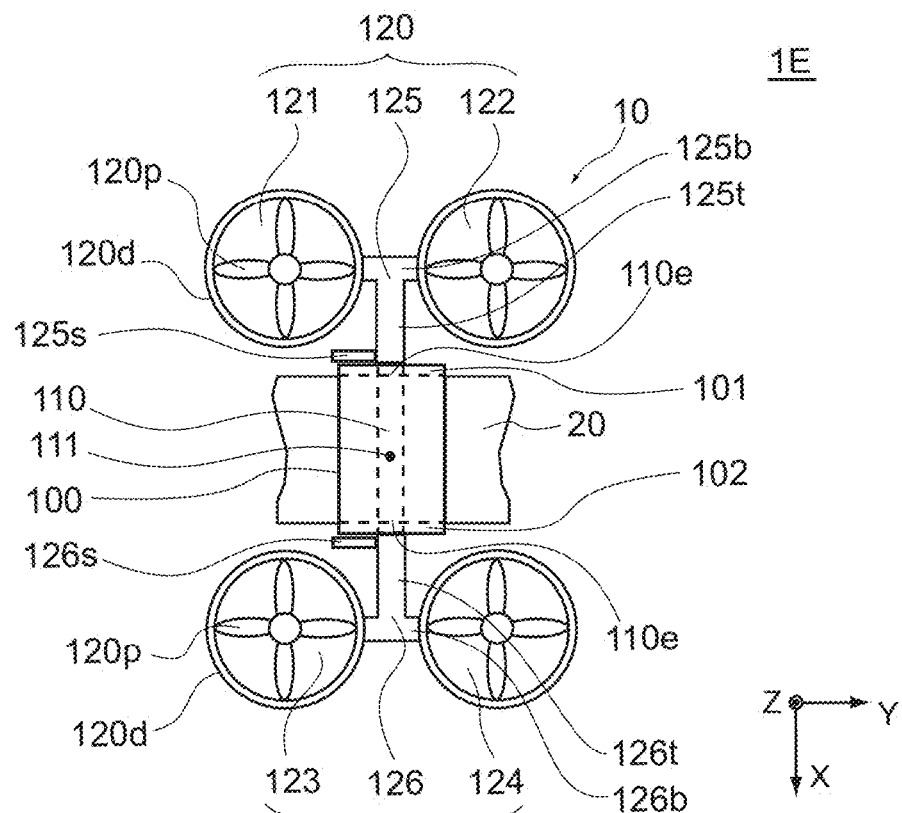
FIG. 9(a) is a schematic top view of an aerial vehicle according to Modified Example 4.
Figure 9B:
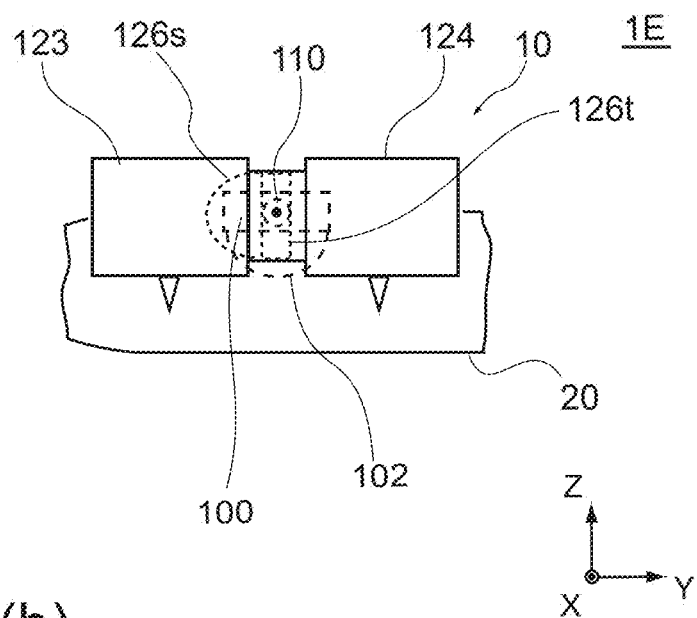
FIG. 9(b) is a schematic side view of the aerial vehicle according to Modified Example 4.

FIG. 9(*a*) is a schematic top view of an aerial vehicle according to Modified Example 4. FIG. 9(*b*) is a schematic side view of the aerial vehicle according to Modified Example 4. In FIGS. 9(*a*) and 9(*b*), the illustrations of some parts of a fuselage unit 20 are omitted.

In an aerial vehicle 1E, a shield plate 125*s* is installed in a trunk portion 125*t* of an arm portion 125 and a shield plate 126*s* is installed in a trunk portion 126*t* of an arm portion 126. Moreover, a base body 100 is provided with a shield plate 101 on the arm portion 125 side and is provided with a shield plate 102 on the arm portion 126 side. In the X-axis direction, the shield plate 125*s* and the shield plate 101 are adjacent to each other and the shield plate 126*s* and the shield plate 102 are adjacent to each other.

Accordingly, the shield plate 125*s* and the shield plate 101 are formed between the arm portion 125 and the base body 100 and the shield plate 126*s* and the shield plate 102 are formed between the arm portion 126 and the base body 100. Due to the provision of such shield plates, the air flow is reduced between the surface of each of the arm portions 125 and 126 and the surface of the base body 100.

In a state in which the surface of each of the arm portions 125 and 126 and the surface of the base body 100 are flush with each other due to the free rotation of the propulsion unit 10 (e.g., during a horizontal cruise phase), no clearance is formed between the surface of each of the arm portions 125 and 126 and the surface of the base body 100. However, when the surface of each of the arm portions 125 and 126 and the surface of the base body 100 are not flush with each other, a clearance is formed between the surface of each of the arm portions 125 and 126 and the surface of the base body 100. When the air leaks out of this clearance, it leads to a decrease in lift of the aerial vehicle and an increase in resistance of the wing portions.

In the aerial vehicle 1E, the air flow is reduced between the surface of each of the arm portions 125 and 126 and the surface of the base body 100 due to the provision of the shield plates 125*s*, 126*s*, 101, and 102, and therefore the decrease in lift and the increase in resistance are suppressed.

Modified Example 5

Figure 10A:
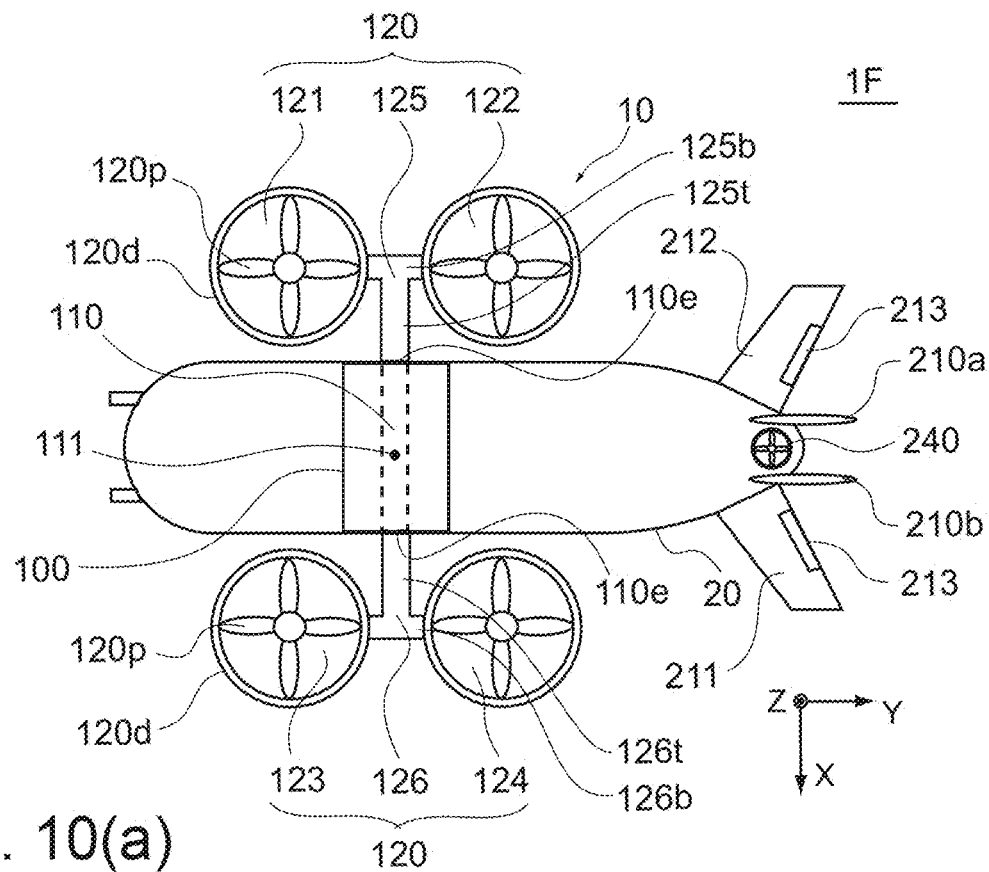
FIG. 10(a) is a schematic top view of an aerial vehicle according to Modified Example 5.
Figure 10B:
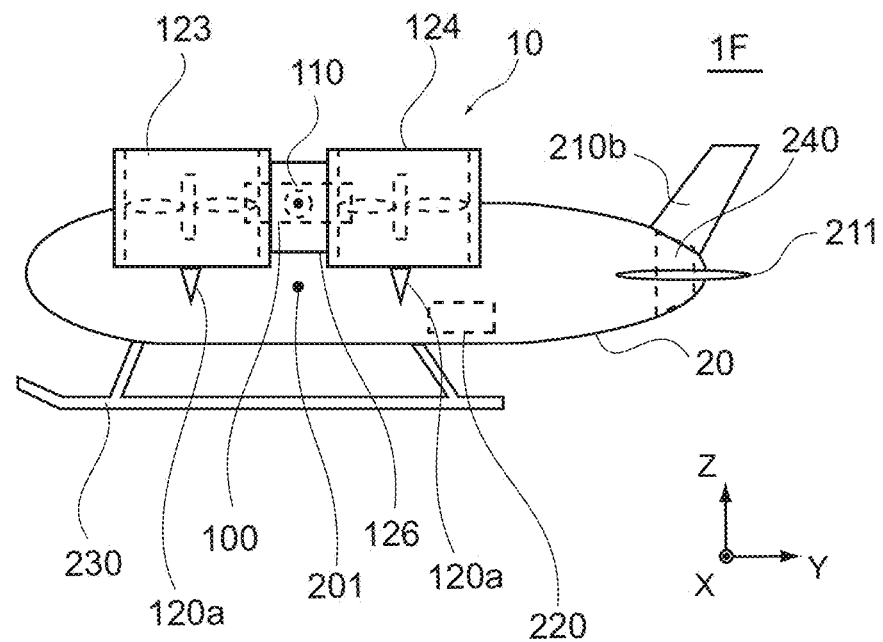
FIG. 10(b) is a schematic side view of the aerial vehicle according to Modified Example 5.

FIG. 10(*a*) is a schematic top view of an aerial vehicle according to Modified Example 5. FIG. 10(*b*) is a schematic side view of the aerial vehicle according to Modified Example 5.

In an aerial vehicle 1F, a part of a fuselage unit 20, which is at the rear of the propulsion unit 10, is provided with a fan 240. The fan 240 is provided between vertical tails 210*a* and 210b arranged in parallel. The fan 240 provides a rotational force for the fuselage unit 20 to rotate around the rotary shaft 110.

With such a configuration, during a hovering phase or a low-speed flight phase, the horizontal attitude can be easily maintained due to an appropriate propulsion force of the fan 240. Moreover, the fan 240 is installed inside the fuselage unit 20, and therefore a sound-muffling effect acts on the fuselage unit 20.

Modified Example 6

Figure 11A:
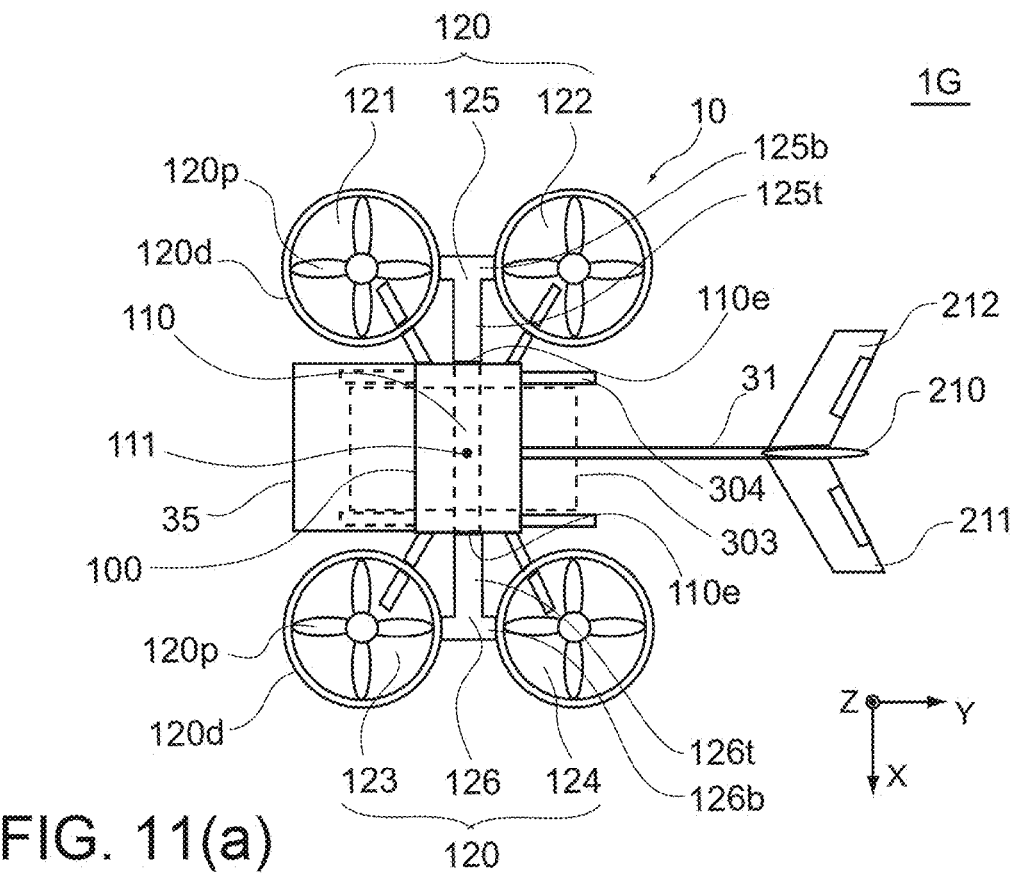
FIG. 11(a) is a schematic top view of an aerial vehicle according to Modified Example 6.
Figure 11B:
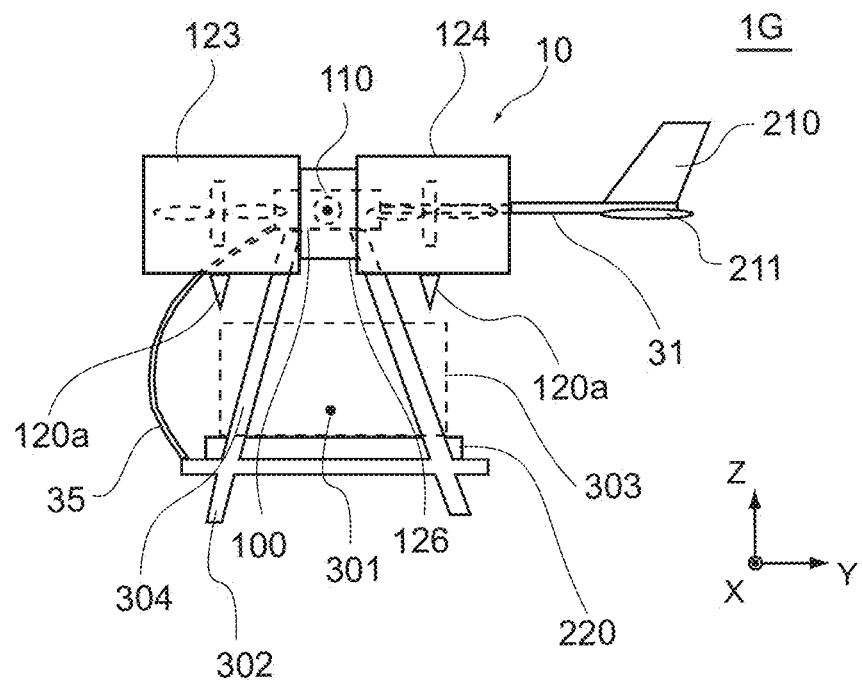
FIG. 11(b) is a schematic side view of the aerial vehicle according to Modified Example 6.

FIG. 11(a) is a schematic top view of an aerial vehicle according to Modified Example 6. FIG. 11(b) is a schematic side view of the aerial vehicle according to Modified Example 6.

In an aerial vehicle 1G, a carrier 30 having leg portions 302 is, under the propulsion unit 10, connected to the base body 100. The carrier 30 has an assembled structure in which it is framed with a plurality of arms 304. The carrier 30 has a storage space 303 in which an article and the like can be loaded. A power supply 220 is disposed below the storage space 303. Moreover, a center of gravity 301 of the carrier 30 including the power supply 220 is located just below a center 111 of a rotary shaft 110.

Moreover, a wind shield 35 having a curved surface protruding forward is provided at the front of the aerial vehicle 1G. The wind shield 35 is supported by the carrier 30 and the base body 100, for example. Moreover, an arm portion 31 extends from the base body 100 to the rear of the aerial vehicle 1G. A vertical tail 210 and horizontal tails 211 and 212 are provided at an end portion of this arm portion 31.

Also with such a configuration, the aerial vehicle 1G has both the vertical take-off and landing function and the horizontal cruise function and has an excellent cruising performance.

Modified Example 7

Figure 12A:
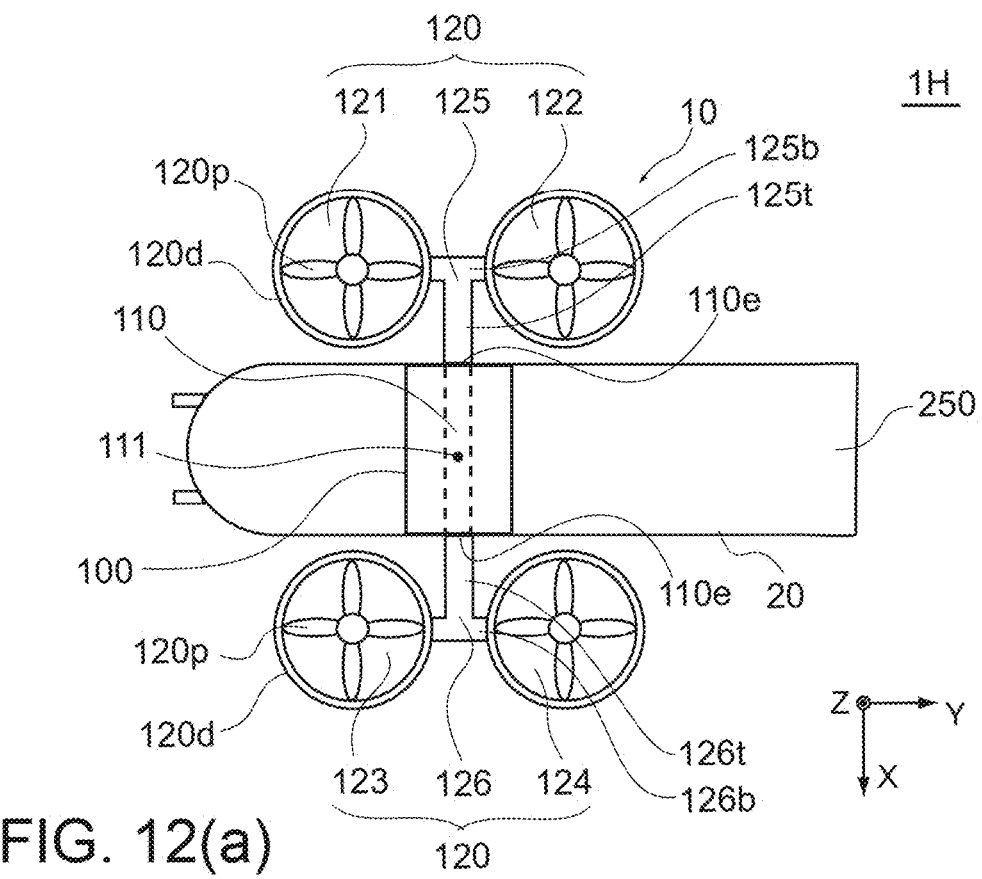
FIG. 12(a) is a schematic top view of an aerial vehicle according to Modified Example 7.
Figure 12B:
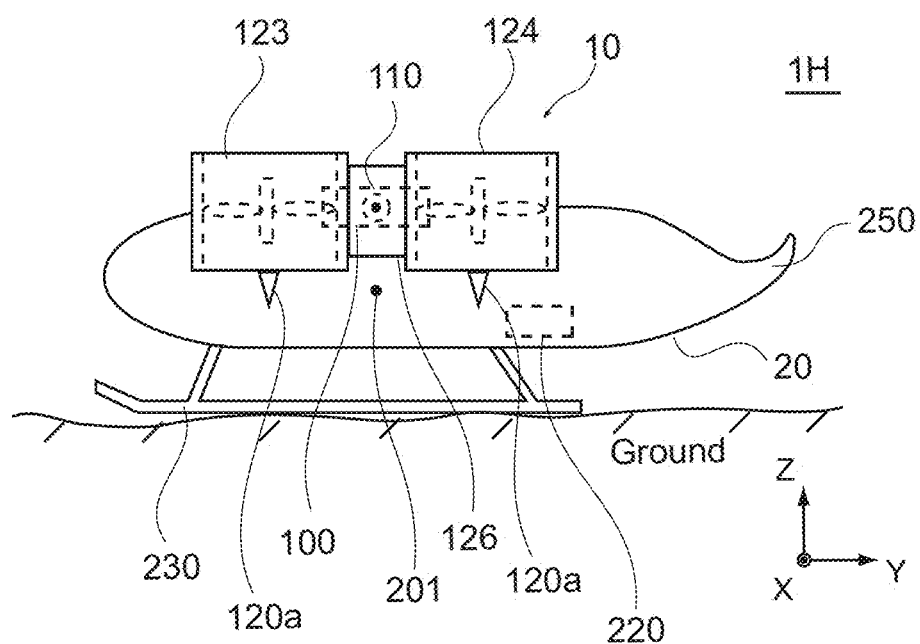
FIG. 12(b) is a schematic side view of the aerial vehicle according to Modified Example 7.

FIG. 12(a) is a schematic top view of an aerial vehicle according to Modified Example 7. FIG. 12(b) is a schematic side view of the aerial vehicle according to Modified Example 7.

In an aerial vehicle 1H, a part of a vertical cross-section of a fuselage unit 20, which is taken in the Y-axis direction, is configured to have an inverse camber shape. For example, a rear fuselage portion 250 at the rear of the propulsion unit 10 has an inverse camber shape in which the bottom side of the vertical cross-section taken in the Y-axis direction is turned up.

With such a configuration, aerodynamic stability can be obtained without the tail unit by improving the aerodynamic configuration of the fuselage unit 20. Moreover, the omission of the tail unit achieves a reduction in weight of the aerial vehicle and a decrease in resistance.

Modified Example 8

Figure 13A:
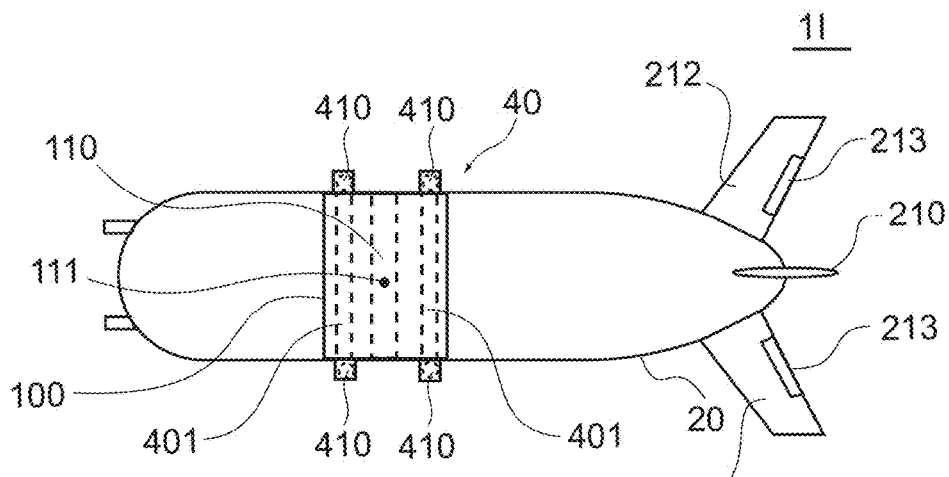
FIG. 13(a) is a schematic top view of an aerial vehicle according to Modified Example 8.
Figure 13B:
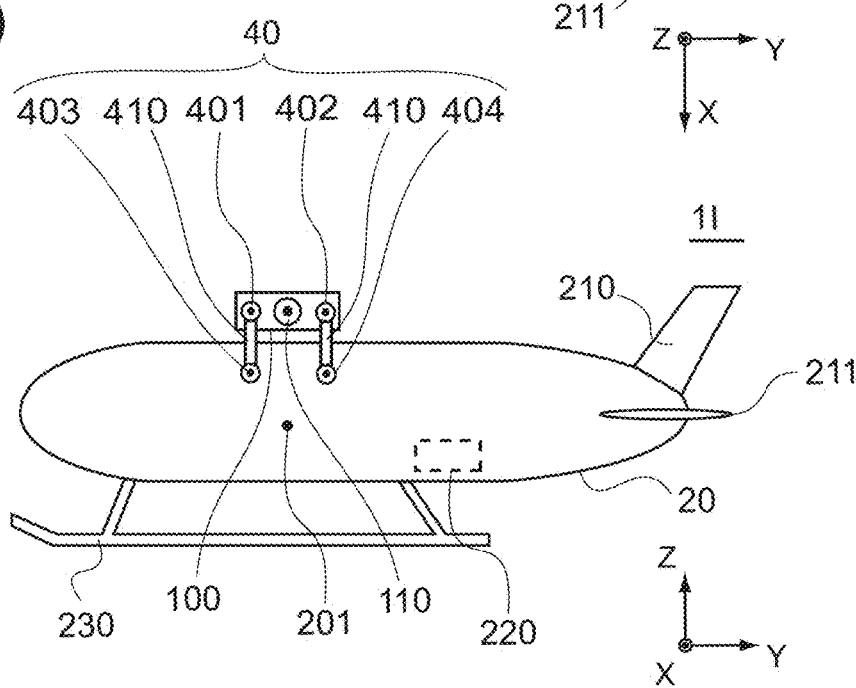
FIG. 13(b) is a schematic side view of the aerial vehicle according to Modified Example 8.
Figure 13C:
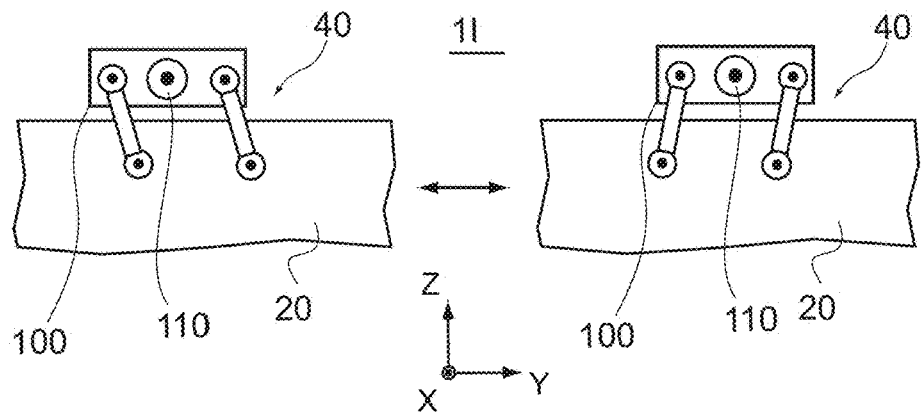
FIG. 13(c) is a schematic view describing an operation example of the aerial vehicle according to Modified Example 8.

FIG. 13(a) is a schematic top view of an aerial vehicle according to Modified Example 8. FIG. 13(b) is a schematic side view of the aerial vehicle according to Modified Example 8. FIG. 13(c) is a schematic view describing an operation example of the aerial vehicle according to Modified Example 8. In FIGS. 13(a) and 13(b), a propulsion unit 10 other than a base body 100 is not shown in order to describe a parallel link mechanism 40. In FIG. 13(c), the parallel link mechanism 40 and its periphery are mainly shown.

In an aerial vehicle 11, the parallel link mechanism 40 is provided between a fuselage unit 20 and a propulsion unit 10. The parallel link mechanism 40 includes a pair of rotary shafts 401 and 402, a pair of rotary shafts 403 and 404, and a plurality of arms 410.

The rotary shafts 401 and 402 penetrate the base body 100 in the X-axis direction. The rotary shafts 401 and 402 extend in the X-axis direction. The rotary shafts 401 and 402 are arranged in the Y-axis direction. The rotary shafts 403 and 404 penetrate the fuselage unit 20 in the X-axis direction. The rotary shafts 403 and 404 extend in the X-axis direction. The rotary shafts 403 and 404 are arranged in the Y-axis direction. The distance between the rotary shafts 403 and 404 arranged in the Y-axis direction is equal to the distance between the rotary shafts 401 and 402 arranged in the Y-axis direction. Each of the rotary shafts 401 and 402 freely rotates inside the base body 100. Each of the rotary shafts 403 and 404 freely rotates inside the fuselage unit 20.

Both end portions of the rotary shaft 401 and both end portions of the rotary shaft 403 are connected to each other via any one of the plurality of arms 410 and both end portions of the rotary shaft 402 and both end portions of the rotary shaft 404 are connected to each other via any one of the plurality of arms 410. The plurality of arms 410 are arranged in parallel with each other. The plurality of arms 410 has the same length.

Without such a parallel link mechanism 40, as shown in FIG. 13(c), the base body 100 has a degree of freedom in a front-to-rear direction of the fuselage unit 20, i.e., the Y-axis direction. Then, the fuselage unit 20 is suspended from the base body 100 via the parallel link mechanism 40.

Accordingly, even when a pitching moment induced at the front of the aerial vehicle acts on the fuselage unit 20 due to drag or the like during a horizontal cruise phase, this moment is unlikely to act on the fuselage unit 20 due to one pair of arms 410 arranged in a front-to-rear direction. Similarly, even when a pitching moment induced at the rear of the aerial vehicle acts on the fuselage unit 20 due to drag or the like during a horizontal cruise phase, this moment is unlikely to act on the fuselage unit 20 due to one pair of arms 410 arranged in the front-to-rear direction.

In particular, when the force that reduces the pitching moment due to the horizontal tails 211 and 21 becomes not effective during a low-speed horizontal cruise phase, the action of the parallel link mechanism 40 effectively works.

Modified Example 9

Figure 14A:
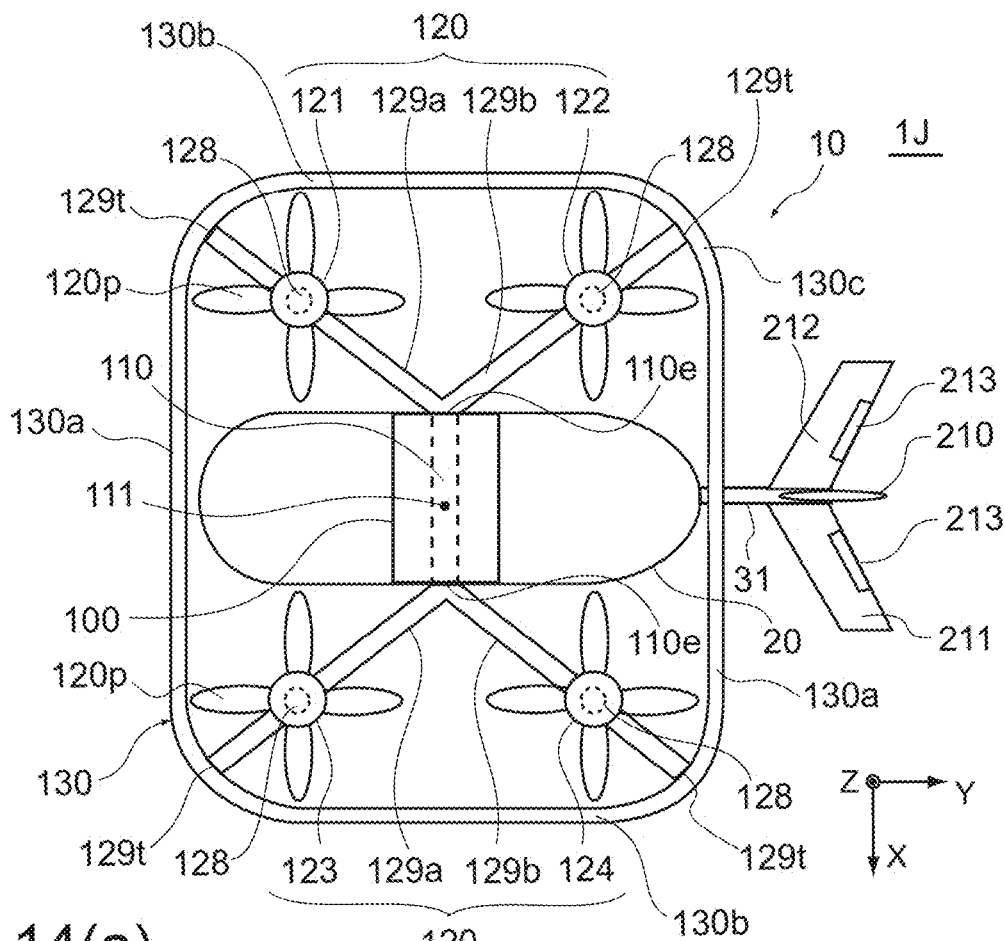
FIG. 14(a) is a schematic top view of an aerial vehicle according to Modified Example 9.
Figure 14B:
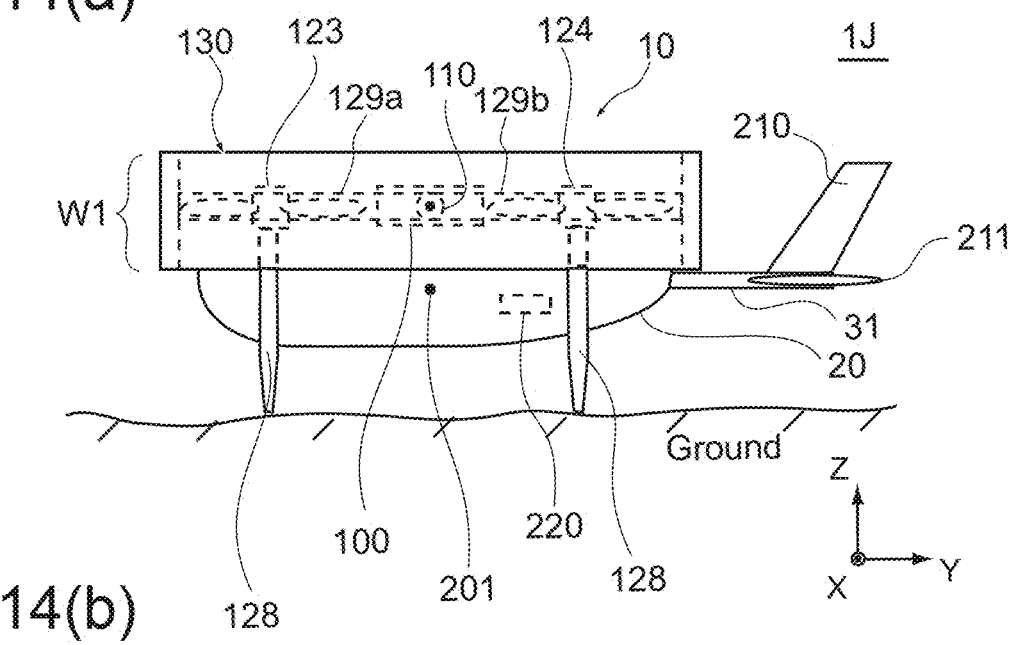
FIG. 14(b) is a schematic side view of the aerial vehicle according to Modified Example 9.
Figure 15:
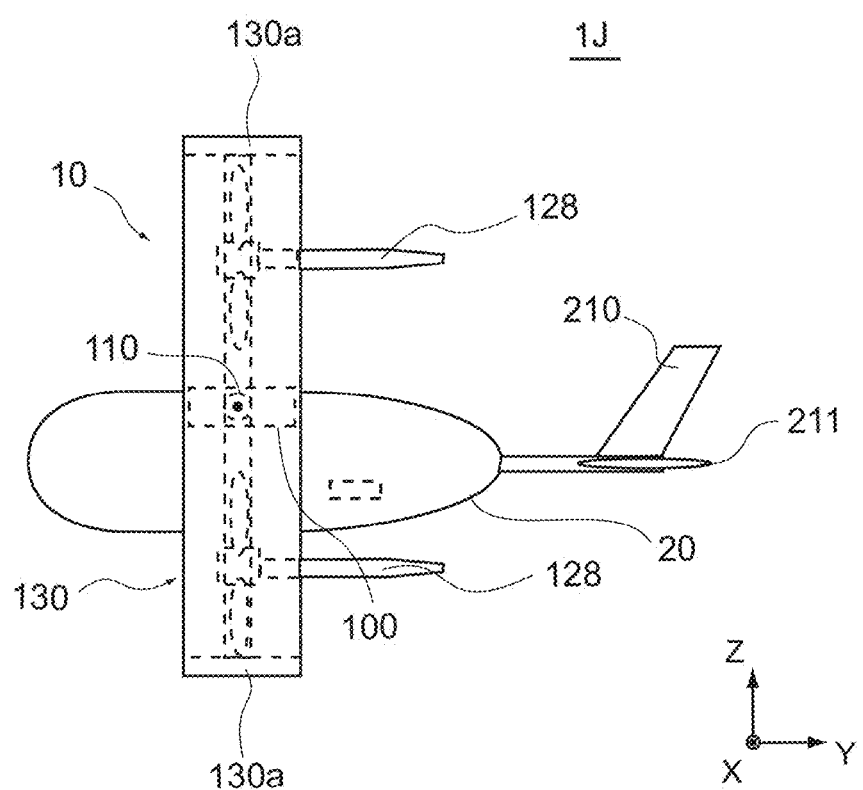
FIG. 15 is a schematic side view showing an operation example in the aerial vehicle according to Modified Example 9.

FIG. 14(a) is a schematic top view of an aerial vehicle according to Modified Example 9. FIG. 14(b) is a schematic side view of the aerial vehicle according to Modified Example 9. FIG. 15 is a schematic side view showing an operation example in an aerial vehicle according to Modified Example 9.

Propeller mechanisms 120 in an aerial vehicle 1J are mounted on both ends 110e of a rotary shaft 110. The propeller mechanisms 120 are approximately point-symmetry with reference to a center 111. The propeller mechanisms 120 include arm portions 129a and 129b, a propeller portion 121, and a propeller portion 122 on one side of the fuselage unit 20 and include arm portions 129a and 129b, a propeller portion 123, and a propeller portion 124 on the other side of the fuselage unit 20.

The arm portions 129a approximately linearly extend to the front of the fuselage unit 20 from the both ends 110e. The arm portions 129b approximately linearly extend to the rear of the fuselage unit 20 from the both ends 110e. That is, the arm portions 129a and the arm portions 129b are separated from each other at the both ends 110e.

The propeller portion 121 and the propeller portion 122 are arranged in parallel in the direction orthogonal to the X-axis direction. The propeller portion 123 and the propeller portion 124 are arranged in parallel in the direction orthogonal to the X-axis direction. The propeller portion 121 is fixed to the one end 110e of the rotary shaft 110 via the arm portion 129a. The propeller portion 122 is fixed to the one end 110e of the rotary shaft 110 via the arm portion 129b. The propeller portion 123 is fixed to the other end 110e of the rotary shaft 110 via the arm portion 129a. The propeller portion 124 is fixed to the other end 110e of the rotary shaft 110 via the arm portion 129b.

Moreover, in the aerial vehicle 1J, an inner wall of a fence 130 is fixed to distal ends 129t of the two arm portions 129a and distal ends 129t of two arm portions 129b. The fence 130 is an annular member obtained by forming a band-like plate material in an annular shape, and includes, for example, a pair of fence portions 130a extending approximately parallel in the X-axis direction, a pair of fence portions 130b approximately orthogonal to the X-axis direction, and fence portions 130c connecting the fence portions 130a and the fence portions 130b. Here, the fence portions 130a and 130b are flat plates and the fence portions 130c are bent.

Assuming the width of the fence 130 is denoted by W1 (width in direction parallel to the propeller plane), the width W1 is configured to be larger than the thickness of each of the propeller portions 121 to 124. Accordingly, each of the propeller portions 121 to 124 is surrounded by the fence 130. The fence 130 also functions a duct surrounding all the propeller portions 121 to 124.

An example in which the aerial vehicle 1J horizontally cruises is shown in FIG. 15. In FIG. 15, the aerial vehicle 1J cruising horizontally is viewed from the side.

During the horizontal cruise phase of the aerial vehicle 1J, the fence 130 rotates around the rotary shaft 110 and the fuselage unit 20 is surrounded by the fence 130. That is, the fence portions 130a are positioned above and below the fuselage unit 20. At this time, plate surfaces of the upper and lower fence portions 130a are approximately parallel to a direction in which it horizontally cruises and the upper and lower fence portions 130a make the aerial vehicle 1J produce lift as main wings of the aerial vehicle 1J.

Moreover, in the aerial vehicle 1J, since the fence 130 surrounds all the propeller portions 121 to 124, the capacity of the duct (i.e., fence 130) can be reduced as compared to a configuration in which the duct is additionally provided to each of the propeller portions 121 to 124. Accordingly, a reduction in weight of the aerial vehicle can be achieved. Moreover, since the fence 130 is annular and has the predetermined width W1, the fence 130 has a desired mechanical strength.

For example, in a case where the diameters of the propellers 121 to 124 are equal, the total side area of the duct portion is smaller as compared to the configuration in which the duct is provided for each of the propellers 121 to 124, and therefore a reduction in weight can be achieved and a decrease in drag can be achieved. Moreover, due to the box-shaped structure of the fence 130, the duct can be reduced in weight with the desired strength kept. In addition, during a horizontal flight phase, the fence 130 produces lift.

At this time, since the fence 130 has the box-shape and the reduced weight, it is sufficient to primarily apply tension on the arm portions 129a and 129b.

Moreover, due to the fence 130 surrounded by the propeller portions 121 to 124, sound emitted by the propeller portions 121 to 124 is insulated by the fence 130. Accordingly, the aerial vehicle 1J has an excellent silent property.

Hereinabove, the embodiment and the examples of the present invention have been described, though the present invention is not limited only to the above embodiments and the examples and various modifications can be made as a matter of course. The embodiment and the examples are not necessarily independent and can be combined as long as it is possible in terms of the technology.

REFERENCE SIGNS LIST 1A, 1B, 1C, 1D, 1E, 1F, 1G, 1I, 1J aerial vehicle
10 propulsion unit
20 fuselage unit
100 base body
30 carrier
31, 125, 125c, 125d, 126, 126c, 126d arm portion
35 wind shield
40 parallel link mechanism
101, 102, 125s, 126s shield plate
110, 401, 402, 403, 404 rotary shaft
110e end
111 center
120 propeller mechanism
120a, 127, 213 aileron
120d duct
120p propeller
121, 122, 123, 124 propeller portion
125b, 126b branch portion
125t, 126t trunk portion
128, 302 leg portion
129a, 129b arm portion
129t distal end
130 fence
130a, 130b, 130c fence portion
201, 301 center of gravity
202 mounting portion
210, 210a, 210b vertical tail
211, 212 horizontal tail
220 power supply
231 skid
240 fan
250 rear fuselage portion
303 storage space
304, 410 arm

The invention claimed is:

1. An aerial vehicle, comprising:
a propulsion unit that includes a base body, a rotary shaft extending in a first direction and penetrating the base body, and thrust producing mechanisms provided at both ends of the rotary shaft and produces a propulsion force for flying in air; and
a fuselage unit that is suspended from the propulsion unit below the rotary shaft, has a center of gravity at a position below the rotary shaft, is configured to be freely rotatable around the rotary shaft, and is capable of storing an article,
wherein a first pair of propeller portions is mounted on one end of the rotary shaft, and a second pair of propeller portions is mounted on another end of the rotary shaft, wherein the first pair of propeller portions is arranged in parallel in a second direction orthogonal to the first direction, and the second pair of propeller portions is arranged in parallel in the second direction, and wherein the rotary shaft is configured to be freely rotatable in the base body according to propulsion forces emitted by each propeller portion of the first pair of propeller portions and each propeller portion of the second pair of propeller portions.

2. The aerial vehicle according to claim 1, wherein in the propulsion unit, the thrust producing mechanisms turn into a vertical attitude in which thrust axes of the thrust producing mechanisms become parallel to a direction of gravity or in a horizontal attitude in which the thrust axes become perpendicular to the direction of gravity, the fuselage unit takes off and lands in the vertical attitude with the propulsion force, and the fuselage unit horizontally cruises in the horizontal attitude with the propulsion force.

3. The aerial vehicle according to claim 2, wherein the fuselage unit has a shape having a short direction in the first direction and having a longitudinal direction in the second direction orthogonal to the first direction and maintains a horizontal state in a state in which the propulsion unit is suspended.

4. The aerial vehicle according to claim 2, wherein the fuselage unit is provided with a tail unit at a rear of the propulsion unit.

5. The aerial vehicle according to claim 2, wherein the fuselage unit is provided with a fan that provides a rotational force that rotates the fuselage unit around the rotary shaft at rear of the propulsion unit.

6. The aerial vehicle according to claim 2, wherein the fuselage unit includes a power supply that supplies the thrust producing mechanisms with electric power.

7. The aerial vehicle according to claim 1, wherein the fuselage unit has a shape having a short direction in the first direction and having a longitudinal direction in the second direction orthogonal to the first direction and maintains a horizontal state in a state in which the propulsion unit is suspended.

8. The aerial vehicle according to claim 7, wherein a part of a vertical cross-section taken in the second direction of the fuselage unit is configured to have an inverse camber shape.

9. The aerial vehicle according to claim 1, wherein the fuselage unit is provided with a tail unit at rear of the propulsion unit.

10. The aerial vehicle according to claim 9, wherein the tail unit is provided with a first aileron.

11. The aerial vehicle according to claim 1, wherein the fuselage unit is provided with a fan that provides a rotational force that rotates the fuselage unit around the rotary shaft at a rear of the propulsion unit.

12. The aerial vehicle according to claim 1, wherein the fuselage unit includes a power supply that supplies the thrust producing mechanisms with electric power.

13. The aerial vehicle according to claim 1, wherein the fuselage unit is configured to be removable from the propulsion unit.

14. The aerial vehicle according to claim 1, wherein the thrust producing mechanisms each includes:

a first propeller portion and a second propeller portion that are mounted on one end of the rotary shaft via a first arm portion; and a third propeller portion and a fourth propeller portion that are mounted on another end of the rotary shaft via the second arm portion, and wherein, in a direction orthogonal the first direction, the first propeller portion and the second propeller portion are arranged in parallel and the third propeller portion and the fourth propeller portion are arranged in parallel.

15. The aerial vehicle according to claim 14, wherein the first arm portion and the second arm portion are each provided with a second aileron.

16. The aerial vehicle according to claim 14, wherein the first propeller portion, the second propeller portion, the third propeller portion, and the fourth propeller portion each includes a propeller and a cylindrical duct surrounding the propeller, and wherein the duct produces lift when the fuselage unit horizontally cruises.

17. The aerial vehicle according to claim 16, wherein the duct is provided with a third aileron.

18. The aerial vehicle according to claim 16, wherein the duct is provided with a leg portion extending in a direction opposite to a direction in which the propulsion force acts.

19. The aerial vehicle according to claim 14, wherein the propulsion unit includes a base body that the rotary shaft penetrates, and wherein a first shield portion is provided between the first arm portion and the base body, the first shield portion reduces an air flow flowing between a surface of the first arm portion and a surface of the base body, and a second shield portion is provided between the second arm portion and the base body, the second shield portion reduces an air flow flowing between a surface of the second arm portion and the surface of the base body.

20. The aerial vehicle according to claim 1, further comprising a parallel link mechanism having a degree of freedom in a second direction orthogonal to the first direction between the fuselage unit and the propulsion unit, wherein the fuselage unit is suspended from the propulsion unit via the parallel link mechanism.

* * * * *